US012765516B2

(12) United States Patent
Ottosson et al.

(10) Patent No.: US 12,765,516 B2
(45) Date of Patent: Oct. 20, 2026

(54) PET TREAT PUZZLE

(71) Applicant: The Kyjen Company, LLC, Centennial, CO (US)

(72) Inventors: Nina Ottosson, Karlskoga (SE); Chaz Ozzello, Englewood, CO (US); Meghan Higgins, Denver, CO (US); Danielle Salyer, Denver, CO (US); Lynn Rosen, Parker, CO (US); Jeffrey Paris, Los Angeles, CA (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 19/078,162

(22) Filed: Mar. 12, 2025

(65) Prior Publication Data

US 2025/0287920 A1 Sep. 18, 2025

Related U.S. Application Data

(60) Provisional application No. 63/632,701, filed on Apr. 11, 2024, provisional application No. 63/564,165, filed on Mar. 12, 2024.

(51) Int. Cl.
*A01K 15/02* (2006.01)

(52) U.S. Cl.
CPC .................................. *A01K 15/025* (2013.01)

(58) Field of Classification Search
CPC .................................................... A01K 15/025
See application file for complete search history.

(56) References Cited

U.S. PATENT DOCUMENTS 7,198,005 B2 * 4/2007 Polimeni, Jr. ........ A01K 5/0114 119/72
8,316,804 B2 11/2012 Ottosson
D676,619 S 2/2013 Hansen
D755,446 S * 5/2016 Hansen ........................ D30/121
9,532,551 B1 1/2017 Conde
9,756,835 B1 9/2017 Ottosson
D975,196 S 1/2023 Wu
D991,587 S 7/2023 Wu
(Continued)

FOREIGN PATENT DOCUMENTS

CN 307419650 S 6/2022
CN 307419671 S 6/2022
(Continued)

OTHER PUBLICATIONS

KR 101264278 B1 Translation (Year: 2013).*
(Continued)

*Primary Examiner* — Kimberly S Berona
*Assistant Examiner* — Steven J Shur
(74) *Attorney, Agent, or Firm* — Lempia Summerfield Katz LLC

(57) ABSTRACT

A pet toy includes a base having at least one treat compartment and a platform rotatably coupled to the base. The platform includes at least one track having a pair of opposing side walls and at least one opening extending through the platform. The at least one opening is disposed between the pair of opposing side walls. The pet toy further includes a plurality of tiles movably coupled to the track, each of the plurality of tiles configured to selectively cover a portion of the at least one opening.

12 Claims, 17 Drawing Sheets

(56) References Cited

U.S. PATENT DOCUMENTS

| | | | | | |
|---|---|---|---|---|---|
| D992,222 | S | | 7/2023 | Ye | |
| D995,947 | S | | 8/2023 | Ye | |
| D998,913 | S | | 9/2023 | Wu | |
| D1,000,016 | S | | 9/2023 | Wu | |
| D1,000,728 | S | | 10/2023 | Wu | |
| D1,001,397 | S | * | 10/2023 | Wu | D30/160 |
| D1,002,967 | S | | 10/2023 | Wu | |
| D1,004,861 | S | | 11/2023 | Zhong | |
| D1,017,922 | S | | 3/2024 | Li | |
| 11,944,077 | B2 | | 4/2024 | Bone et al. | |
| D1,027,057 | S | * | 5/2024 | Wu | D30/160 |
| D1,038,539 | S | * | 8/2024 | Hu | D30/129 |
| D1,044,161 | S | | 9/2024 | Miranda et al. | |
| D1,044,165 | S | | 9/2024 | Li | |
| D1,048,597 | S | | 10/2024 | Wu | |
| 2012/0204799 | A1 | * | 8/2012 | Desrosiers | A01K 5/0114 119/702 |
| 2014/0202396 | A1 | | 7/2014 | Hansen | |
| 2014/0224185 | A1 | * | 8/2014 | Hansen | A01K 15/025 119/710 |
| 2014/0251231 | A1 | * | 9/2014 | Hansen | A01K 15/025 119/710 |
| 2015/0305305 | A1 | * | 10/2015 | Liu | A01K 15/025 119/707 |
| 2020/0187456 | A1 | * | 6/2020 | Citak | A63F 9/0601 |
| 2023/0200351 | A1 | | 6/2023 | Mahtani | |

FOREIGN PATENT DOCUMENTS

| | | | | |
|---|---|---|---|---|
| CN | 307908413 | S | | 3/2023 |
| CN | 308206224 | S | | 9/2023 |
| CN | 308514314 | S | | 3/2024 |
| CN | 308718665 | S | | 7/2024 |
| CN | 308729447 | S | | 7/2024 |
| GB | 90079968060021 | S | | 6/2020 |
| GB | 6300409 | S | | 8/2023 |
| GB | 6300410 | S | | 8/2023 |
| KR | 101264278 | B1 | * | 5/2013 |
| WO | 2017084086 | A1 | | 5/2017 |

OTHER PUBLICATIONS

Dog Puzzle—Dog Food Puzzles Toy Feeder, Treat Puzzle Toys for Dogs (push)—Source: https://www.amazon.com/Aluckmao-Interactive-Stimulation-Dispensing-Stimulating/dp/B0B1JB4JZ1—Dec. 2024 (12 pages).

Dog Puzzle Toys, dogs Food Puzzle Feeder Toys for Iq Training & Mental Enrichment—Source: https://www.amazon.com/Puzzle-Feeder-Training-Mental-Enrichment/dp/B08RY2YRFG—Dec. 2024 (9 pages).

Nina Ottosson by Outward Hound Challenge Slider Dog Toy—Source: https://www.chewy.com/nina-ottosson-by-outward-hound/dp/253238—Dec. 2024 (8 pages).

Nina Ottosson® Outward Hound® Dog Brick Treat Dispensing Dog Toy—Source: https://www.petsmart.com/dog/toys/interactive-toys/nina-ottosson-outward-hound-dog-brick-treat-dispensing-dog-toy-5272573.html—Dec. 2024 (15 pages).

Outward Hound Lickin-layers Interactive Puzzle Game and Slow Feeder Dog Bowl—Source: https://www.petco.com/shop/en/petcostore/product/outward-hound-lickin-layers-interactive-puzzlegame-and-slow-feeder-dog-bowl-3761171—Dec. 2024 (8 pages).

Puzzle Licker Maze—Triple Textures—Source: https://thepuzzlefeeder.com/products/puzzle-lick-bowl-wheat-yellow—Dec. 2024 (8 pages).

Slow Feeder Dog Bowl, Dog Bowl for Dry, Wet, and Raw Food, 9.8 Inches Dog Food Puzzle Makes Mealtime Fun, Dog Puzzles for All Breed Dogs—Source: https://www.amazon.com/Puzzle-Feeder-Mealtime-Healthy-Puzzles/dp/B0BY1SVKLM/ref=sxin_16_pa_sp_search_thematic_sspa?content-id=amzn1.sym.95e4d6bd-d93f-4ee1-9766-ff64f54d2f71%3Aamzn1.sym.95e4d6bd-d93f-4ee1-9766-ff64f54d2f71&crid=1FB6HQXJJCUDG&cv_ct_cx=puzzle+feeder+slow+feeder+dog+bowl&keywords=puzzle+feeder+slow+feeder+dog.

Slow Feeder Dog Bowls, puzzle Dog Bowl for Dry Wet and Raw Food, Comes With Licking Mat and Slowing Mat, Non-slip and Anti-suffocation Reusable Interactive Slow Feeding Dog Bowl—Source: https://www.amazon.com/Pofly-Bowls%EF%BC%8CPuzzle-Non-Slip-Anti-Suffocation-Interactive/dp/B0D2V2SFJQ Dec. 2024 (11 pages).

Zippypaws—Interactive Dog Puzzle Toy—Smartypaws Puzzler Feeder Bowl—Wagging Wheel—Source: https://www.amazon.com/ZippyPaws-Interactive-SmartyPaws-Puzzler-Wagging/dp/B0B4V3X4GM?—Dec. 2024 (8 pages).

* cited by examiner

PET TREAT PUZZLE

This application claims the benefit of priority to U.S. Provisional Application entitled "Pet Treat Puzzle," filed on Mar. 12, 2024, and assigned Ser. No. 63/564,165, and the benefit of priority to U.S. Provisional Application entitled "Pet Treat Puzzle Toy," filed on Apr. 11, 2024, and assigned Ser. No. 63/632,701, the entire disclosures of which are hereby expressly incorporated by reference.

BACKGROUND OF THE DISCLOSURE

Field of the Disclosure

The disclosure relates generally to pet toys, and more specifically, to interactive pet toys that mentally stimulate pets requiring them to perform a series or sequence of manipulations in order to access food within the toy.

Brief Description of Related Technology

Generally, a wide variety of pet toys are available to keep pets entertained. For example, pet toys including one or more of a squeaker, a bell, crinkle paper, and the like may be configured to make noise, entertaining pets. Other pet toys include balls, frisbees, wands, toys including treats (e.g., pet treats, kibble), chew toys, and the like. However, pets may quickly become disinterested in their toys. Accordingly, there is a need for more dynamic and interactive pet toys including multiple functionalities that engage and mentally stimulate pets for longer periods of time.

SUMMARY OF THE DISCLOSURE

In accordance with one aspect of the present disclosure, a pet toy includes a base having at least one treat compartment and a platform rotatably coupled to the base. The platform includes at least one track having a pair of opposing side walls and at least one opening extending through the platform. The at least one opening is disposed between the pair of opposing side walls. The pet toy further includes a plurality of tiles movably coupled to the track, each of the plurality of tiles configured to selectively cover a portion of the at least one opening.

In accordance with another aspect of the present disclosure, a pet toy includes a base including a plurality of treat compartments and a rotating stage rotatably coupled to the base. The rotating stage includes a platform having at least on track including a pair of opposing side walls and at least one opening extending through the platform, the at least one opening disposed between the pair of opposing side walls. The rotating stage also includes a plurality of tiles movably coupled to the at least one track, each of the tiles configured to selectively cover a portion of the at least one opening, and a pin extending through and rotatably coupling the base and the rotating stage.

In accordance with yet another aspect of the present disclosure, a pet toy includes a base including a plurality of treat compartments and a rotating body coupled to the base and configured to selectively cover one or more of the plurality of treat compartments. The rotating body includes a blade and a folding panel rotatably coupled to the blade.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
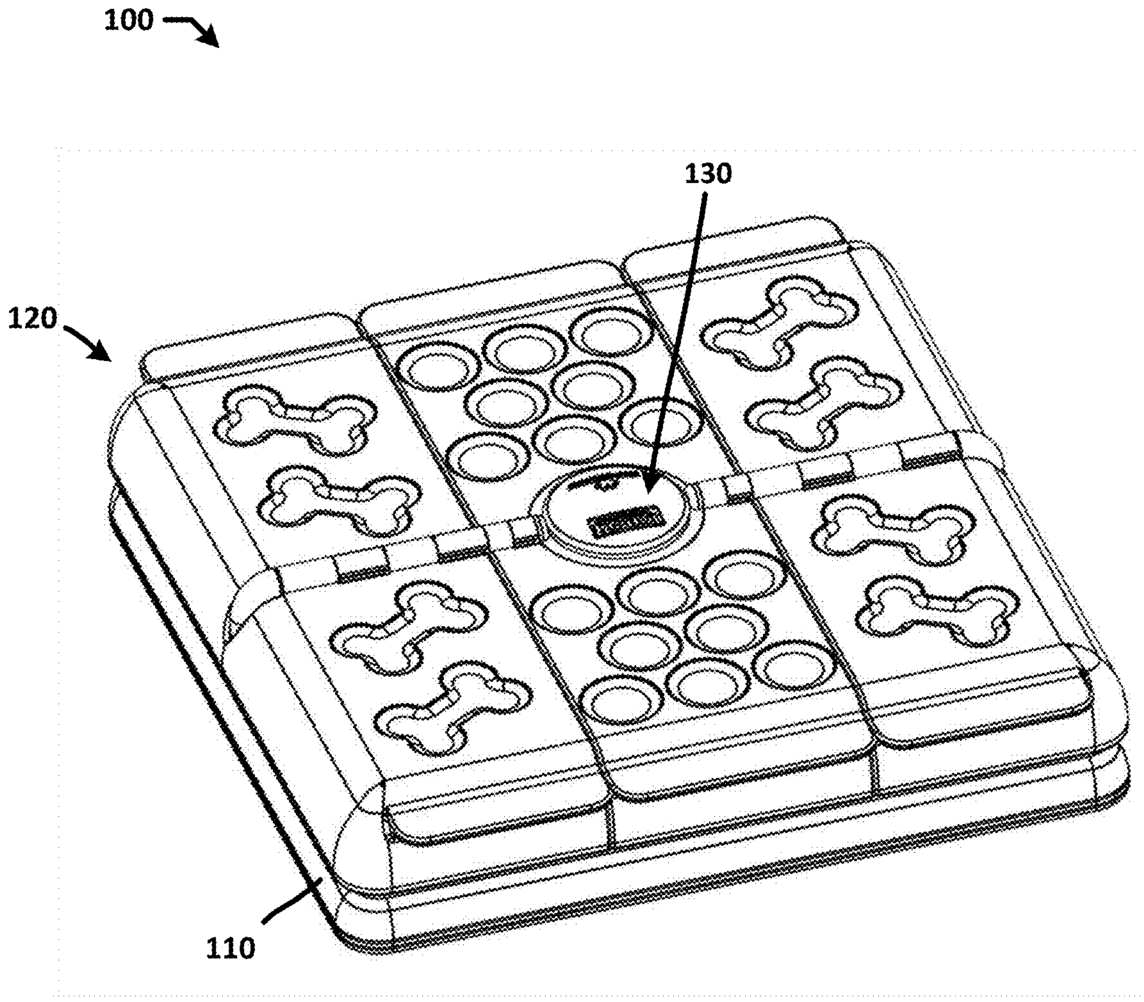
FIG. 1 illustrates a perspective view of a pet toy in accordance with one example of the present disclosure.

While the disclosed pet toys and methods are susceptible of embodiments in various forms, there are illustrated in the drawings (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, the present disclosure provides pet toys that mentally stimulate pets by providing pets with unique puzzles requiring a series of manipulations to access all of the food (e.g., kibble, treats) disposed in the pet toy. Provided herein are pet toys including a plurality of treat compartments configured to hold food for a pet requiring pets to interact with the pet toy, performing a series of movements or manipulations in order to access all of the treat compartments (and the food disposed therein). In some examples, the pet toys described herein may require a pet to engage with (e.g., manipulate, move) a single movable element (e.g., door, tile, platform) multiple times to sequentially access all of the treat compartments. Additionally, the pet toys described herein provide pets with a dynamic playing experience in which a pet may access the plurality of treat compartments in any order, providing pets with a different experience each time the pet plays with the pet toy.

Additionally, provided herein are pet toys including a single compartment or container configured to hold food (e.g., kibble, treats) for a pet and a plurality of elements (e.g., doors, tiles, panels) movably coupled to the container and preventing a pet from accessing a portion of the container (and the food disposed therein). According to the present disclosure, pets may be required to perform a series of movements or manipulations in order to sequentially access an entirety of the container and all of the food disposed therein. In some examples, the pet toys described herein may require a pet to engage with (e.g., manipulate, move) a single movable element (e.g., door, tile, platform) multiple times to access an entirety of the container. Additionally, the pet toys described herein provide pets with a dynamic playing experience in which a pet may access the various portions of the container in any order, providing pets with a different experience each time that the pet plays with the pet toy.

In accordance with some examples, provided herein are pet toys including a base having a plurality of treat compartments and a platform rotatably coupled to the base. The platform may include at least one track and at least one opening disposed in a middle of the track. In some examples, the at least one track may include a pair of opposing side walls, and an opening may be disposed between the pair of sidewalls. The platform may rotate relative to the base, such that as the platform rotates the at least one opening disposed in the platform aligns with different ones of the plurality of treat compartments disposed in the base.

In accordance with some examples, a plurality of tiles may be movably coupled to the track. For example, the plurality of tiles may be movably coupled to the track so as to selectively cover or block a portion of the at least one opening extending through the platform. The plurality of tiles may include one or more tiles removably coupled to the track and one or more tiles slidably coupled to the track. According to the present disclosure, one or more removable tiles may be removed from the track such that one or more treat compartments disposed in the base are accessible through a portion of the at least one opening covered by the tile(s) before the tile(s) were removed. Accordingly, a pet may access one or more treat compartments aligned with or disposed below a portion of the opening that is not covered by a tile. According to the present disclosure, after one or more (e.g., of the removable) tiles have been removed from the track, the tile(s) slidably coupled to the track may slide from their original or starting position(s) to a position along the track previously occupied by a removable tile, such that, one or more treat compartments disposed below the slidable tile(s) when the slidable tile(s) are in their original or starting position(s) are accessible through the opening. Accordingly, a pet may access the one or more treat compartments disposed below the original or starting position of the slidable tile by: (1) removing one of the removable tiles; and (2) sliding the slidable tile to a position along the track previously occupied by the removable tile, such that a portion of at least one opening covered by the slidable tile in its original or starting position is open (e.g., not covered or blocked).

According to some examples of the present disclosure, after removing one or more of the removable tiles and sliding the one or more slidable tiles to access all of the treat compartments disposed below the at least one opening, a pet may rotate the platform relative to the base, such that the at least one opening is disposed above a different set or group of treat compartments disposed in the base. A pet may then remove additional tiles and/or slide the slidable tiles to access all of the treat compartments disposed below the at least one opening.

In accordance with some examples of the present disclosure, the pet toy may further include one or more door(s) rotatably coupled to the platform. The one or more doors may selectively cover a portion of the at least one track (e.g., one or more tiles coupled to the track). For example, each of the one or more doors may be configured to rotate between a closed position in which a portion of the track is covered by the door and an open position in which the track is not covered by the door. Accordingly, in some examples, a pet may first have to move the one or more doors from a closed (e.g., starting) position to an open (e.g., solved) position before removing and/or sliding tiles to access the one or more treat compartments through the at least one opening in the platform.

Referring to FIG. 1, a pet toy 100 is illustrated in accordance with one example of the present disclosure. As described above, in accordance with some examples of the present disclosure, the pet toy 100 may include a base 110, a carousel or rotating stage 120, and a pin 130 rotatably coupling the rotating stage 120 to the base 110.

Figure 2:
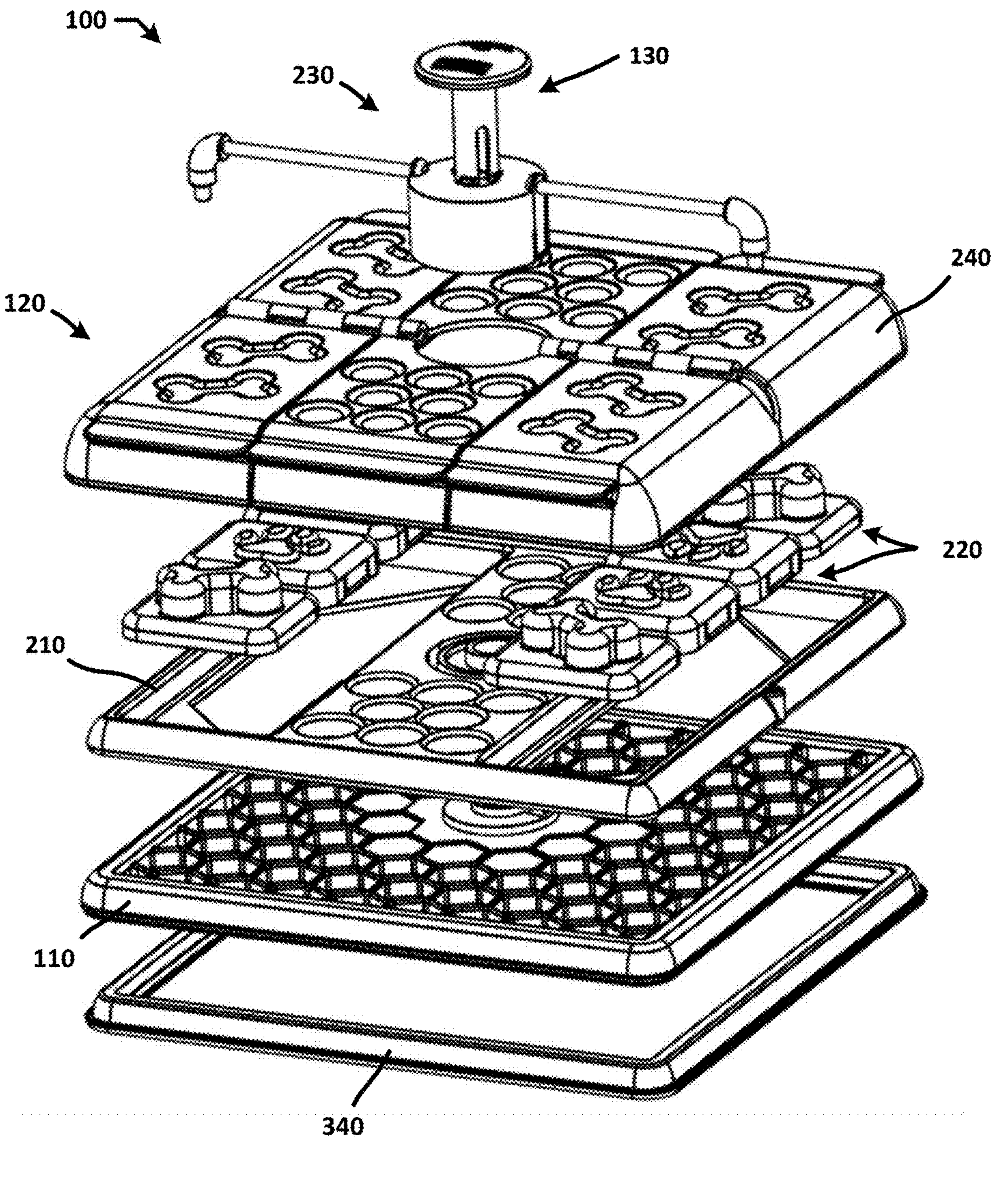
FIG. 2 illustrates an exploded view of the pet toy of FIG. 1 in accordance with one example of the present disclosure.

Referring to FIG. 2, an exploded view of the pet toy 100 of FIG. 1 is illustrated in accordance with one example of the present disclosure. As shown in FIG. 2, the rotating stage 120 may include a platform 210, one or more tiles 220, a hinge support 230, and one or more doors 240. Referring generally to FIG. 2, the base 110 may include one or more treat compartments configured to hold food (e.g., treats, kibble, an edible spread) for pets. The rotating stage 120 may be configured to selectively provide access to the one or more treat compartments included in the base 110. The platform 210 of the rotating stage 120 may include one or more openings extending therethrough. The rotating stage 120 may selectively provide a pet access to the one or more treat compartments included in the base 110 via the one or more openings in the platform 210. As described hereinafter in greater detail, the one or more tiles 220 and one or more doors 240 may be movably coupled to the platform 210 so as to selectively cover a portion of the one or more openings extending through the platform 210, preventing a pet from accessing treat compartment(s) disposed below the covered portion of the opening. Additionally, only some (e.g., less than all) of the treat compartments included in the base 110 may be accessible through the opening for each position of the rotating stage 120 relative to the base 110. Accordingly, in some examples, in addition to moving the one or more tiles 220 and/or doors 240, a pet must rotate the rotating stage 120 relative to the base 110 in order to access all of the treat compartments included in the base.

Figure 3:
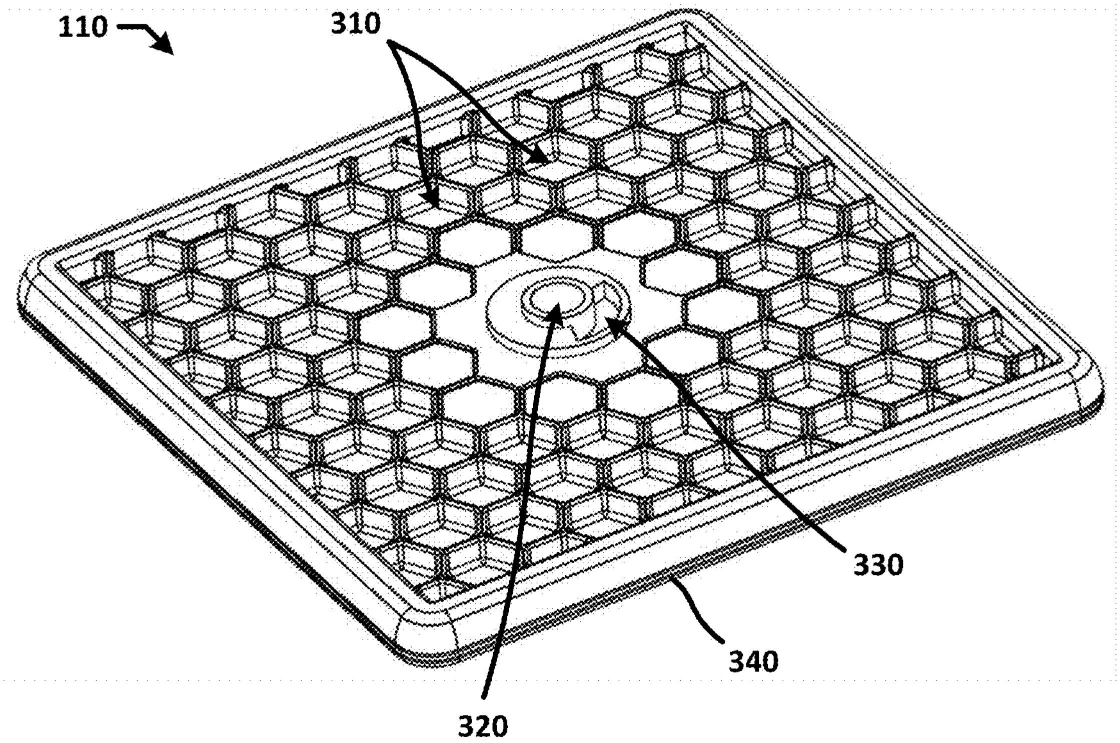
FIG. 3 illustrates a base of the pet toy of FIG. 1 in accordance with one example of the present disclosure.

Referring to FIG. 3, the base 110 of the pet toy 100 of FIGS. 1 and 2 is illustrated in accordance with one example of the present disclosure. As shown in FIG. 3, the base may include a plurality of treat compartments 310. Each of the treat compartments 310 may be configured to receive and hold (e.g., store) food, for example, treats, kibble, pet friendly spreadable foods (e.g., peanut butter), and the like. In accordance with some examples, as shown in FIG. 3, each of the treat compartments 310 may have a polygonal shape, for example, a hexagonal shape. However, the present disclosure is not limited thereto, and in other examples, the treat compartments 310 may have another shape, for example, a different polygonal shape (e.g., triangular, rectangular, square, pentagonal), a round (e.g., circular, oval) shape, or another shape.

As shown in FIG. 3, the base 110 may further include a receptacle 320. As described hereinafter in greater detail, the receptacle 320 may be configured to receive a pin (e.g., pin 130) for rotatably coupling the rotating stage 120 to the base 110. For example, the receptacle 320 may have a circular cross-sectional shape and be configured to receive a pin (e.g., at least a portion of) which has a circular cross-sectional shape, facilitating a movable (e.g., rotatable) connection between the base 110 and the rotating stage 120. In some examples, as shown in FIG. 3, the receptacle 320 may be disposed at a center of the base 110. However, the present disclosure is not limited thereto, and in other examples, the receptacle 320 may be disposed at another location.

As shown in FIG. 3, the base 110 may further include a keyway 330. As described hereinafter in greater detail, the keyway 330 may be configured to receive a key extending from the rotating stage 120 (e.g., the platform 210). As described hereinafter in greater detail, the keyway 330 and the key, collectively, may limit a range of motion (e.g., rotation) of the base 110 and the rotating stage 120 relative to one another.

In accordance with some examples, as shown in FIG. 3, the base 110 may have a rectangular shape. However, the present disclosure is not limited thereto and the base 110 may have another shape. For example, the base 110 may have another polygonal shape (e.g., a triangular, polygonal, hexagonal shape), a curved shape (e.g., a round, circular, oblong, elliptic), or any other shape.

Referring generally to FIGS. 2 and 3, in accordance with some examples, an anti-slip pad or bumper 340 may be coupled to a bottom surface of the base 110. In some examples, as shown in FIGS. 2 and 3, the bumper 340 may be disposed along a perimeter of the base 110. The bumper 340 may be configured to provide stability and prevent the base 110 from slipping or sliding relative to a supporting surface on which the pet toy 100 is disposed. In accordance with some examples, the bumper 340 may be composed of rubber or a similar material. In accordance with some examples, the bumper 340 may be formed (e.g., over molded) on the base 110.

Figure 4:
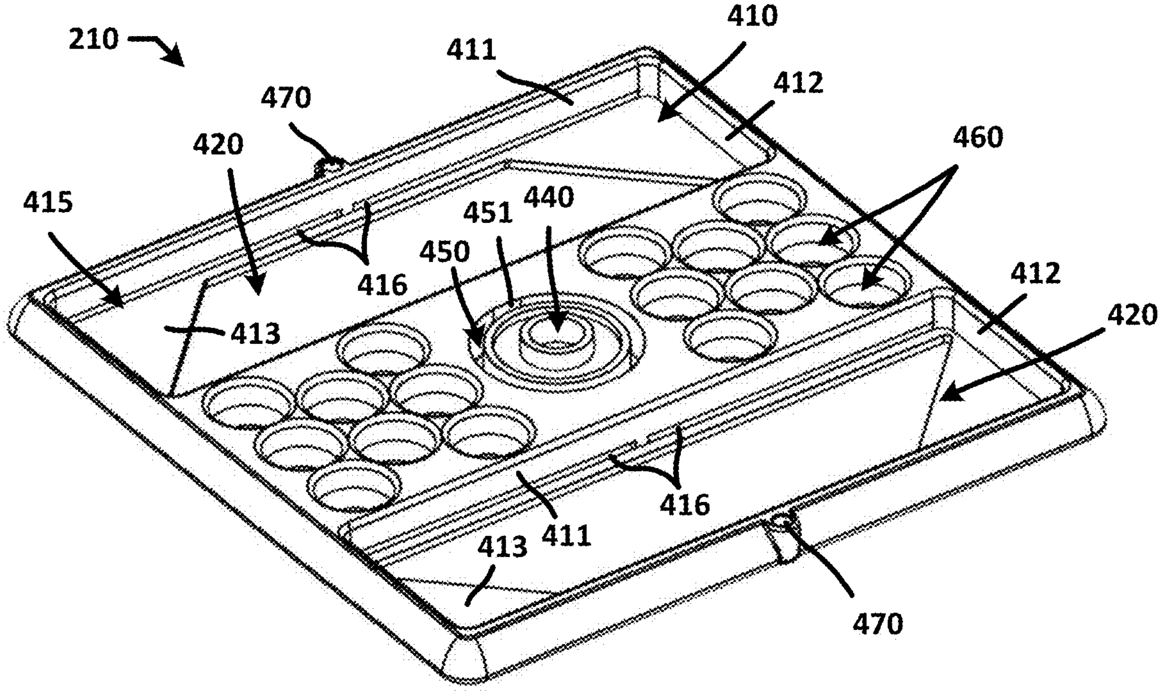
FIG. 4 illustrates a platform of a pet toy of FIG. 1 in accordance with one example of the present disclosure.

Referring to FIG. 4, a top perspective view of the platform 210 of the pet toy 100 is illustrated in accordance with one example of the present disclosure. The platform 210 may include at least one track 410 and at least one opening 420. As shown in FIG. 4, the platform 210 includes two tracks 410. However, the present disclosure is not limited thereto and any number of tracks 410 may be included. For example, one, three, four, or more than four tracks 410 may be provided. As shown in FIG. 4, each of the tracks 410 may include a pair of opposing side walls 411 and a pair of opposing end walls 412 extending between the pair of side walls 411. Each of the tracks 410 may further include a bottom wall 413. The bottom wall 413 may extend between the pair of opposing side walls 411 and/or the pair of opposing end walls 412. According to the present disclosure, the pair of opposing side walls 411, pair of opposing end walls 412, and bottom wall 413 of each of the tracks 410 may form or define a pocket or cavity 415 configured to receive one or more tiles.

The opening 420 may extend through the bottom wall 413 of the track 410. The opening 420 may be disposed between the pair of side walls 411 and/or the pair of end walls 412. As shown, the opening 420 may have a trapezoidal shape. As described hereinafter in greater detail, an opening 420 having a hexagonal shape may advantageously prevent one or more body parts of a pet, for example, a paw or snout, from getting caught between the base 110 and the platform 210. However, the present disclosure is not limited thereto and the opening 420 may have another shape. For example, the opening 420 may have another polygonal shape (e.g., triangular, rectangular, or the like), a rounded or curved shape (e.g., circular, elliptic), an asymmetric shape, or any other shape.

According to the present disclosure, a corresponding number of track(s) 410 and opening(s) 420 may be provided. As describes above, each opening 420 may extend through a bottom wall 413 of a track 410, be disposed between a pair of opposing side walls 411 of the track 410 and/or be disposed between a pair of opposing end walls 412 of the track 410.

Figure 5:
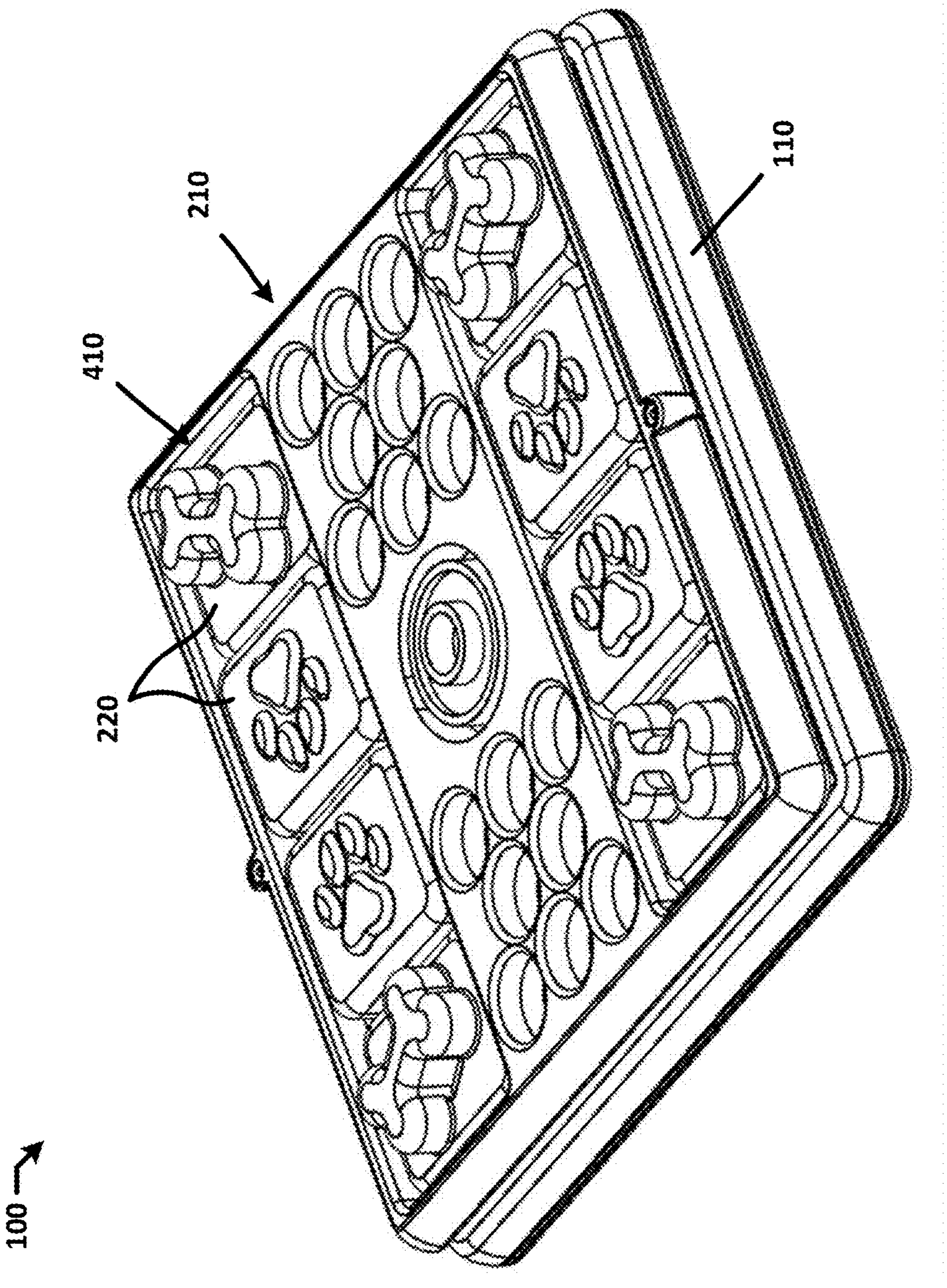
FIG. 5 illustrates a partial view of the pet toy of FIG. 1 in accordance with one example of the present disclosure.

Referring to FIG. 5, a partial view of the pet toy 100 including a plurality of tiles 220 coupled to the platform 210 is illustrated in accordance with one example of the present disclosure. As described above, the plurality of tiles 220 may be movably coupled to the platform 210. For example, each of the plurality of tiles 220 may be movably coupled to a track 410 included in the platform 210. For example, as shown in FIG. 5, when a tile 220 is coupled to the platform 210, (e.g., at least a portion of) the tile 220 may be disposed in a cavity 415 defined by the side walls 411, end walls 412, and bottom wall 413 of the track 410. In other words, when a tile 220 is coupled to the platform 210 it may be disposed between a pair of side walls (e.g., side walls 411), between a pair of end walls (e.g., end walls 412), and/or may rest on (e.g., abut, contact) a bottom wall (e.g., 413) of the track 410.

Figure 6:
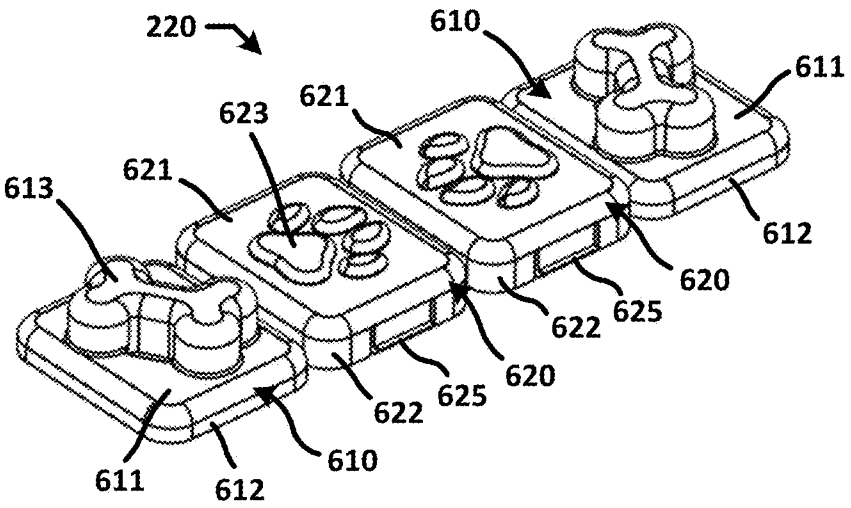
FIG. 6 illustrates a plurality of tiles of the pet toy of FIG. 1 in accordance with one example of the present disclosure.

Referring to FIG. 6, a plurality of tiles 220 are illustrated in accordance with one example of the present disclosure. According to the present disclosure, the plurality of tiles 220 may include two types of tiles 220. For example, the plurality of tiles 220 may include one or more tiles 610 removably coupled to a platform (e.g., platform 210) of the pet toy 100 and one or more tiles 620 slidably coupled to the platform. For example, one or more tiles 610 may be removably coupled to a track (e.g., track 410) and one or more tiles 620 may be slidably coupled to the track.

As shown in FIG. 6, the removable tiles 610 and the slidable tiles 620 may include a top surface 611 and 621, respectively, and an outer wall 612 and 622, respectively, extending (e.g., downward) from the top surface 611, 621 along a periphery of the top surface 611, 621. In accordance with some examples, the removable tiles 610 and the slidable tiles 620 may include a representation or image 613, 623 of an object on a top surface 611, 621 of the tile 610, 620. For example, the images 613, 623 may be elevated (e.g., extend, protrude) from the top surface 611, 621 of the tiles 610, 620. In some examples, a different image 613, 623 may extend from a top surface 611, 621 of the one or more removable tile(s) 610 and the one or more slidable tile(s) 620. The different images 613, 623 may advantageously allow a pet to distinguish between the removable tiles 610 and the slidable tiles 620. According to some examples, an image 613 of a bone may extend from the top surface 611 of the removable tile 610 and an image 623 of a paw may extend from the top surface 621 of the slidable tile 620. However, the present disclosure is not limited thereto, and representations or images 613, 623 of any object or animal may be included on the removable tiles 610 and the slidable times 620, respectively.

As described above, one or more (e.g., removable) tiles 610 may be removably coupled to the platform 210. For example, referring generally to FIGS. 4-6, one or more removable tiles 610 may be removably disposed within a cavity 415 of a track 410 included in the platform 210. When the one or more removable tiles 610 are coupled to the track 410, the removable tiles 610 may rest on (e.g., abut, contact) a bottom wall 413 of the track 410. In some examples, an outer wall 612 of the removable tile 610 may contact one or both side walls 411 and/or an end walls 412 of the track 410 when the removable tile 610 is disposed within the cavity 415. Accordingly, as a pet attempts to remove a tile 610 from the cavity 415 of the track 410, a friction force between the outer wall 612 and the side wall(s) 411 and/or end wall(s) 412 may resist movement of the removable tile 610 out of the cavity 415.

According to other examples, when the removable tile 610 is disposed within the cavity 415 the outer wall 612 of the removable tile may not contact the side wall(s) 411 and/or end wall(s) 412 of the cavity 415, such that only a weight of the removable tile 610 resists movement of the removable tile 610 out of the cavity 415. According to the present disclosure, a pet may remove or separate one or more removable tiles 610 from the platform 210 using one or more of their paws, snout, mouth, or the like. For example, a pet may engage (e.g., bite, paw at, or otherwise manipulate) the protruding representation or image 613 of an object (e.g., bone) on a top surface 611 of the removable tile 610. In this way, the images 613 on the top surfaces 611 of the removable tiles 610 may protrude a greater distance than the images 623 on the top surfaces 621 of the slidable tiles 620, since the raised images 623 are easier for a pet to grab (with mouths or paws) and thereby lift the tiles 610 out of the cavity 415 of the track 410.

Returning to FIG. 4, the track 410 may further include one or more groove(s) 416 configured to receive a portion of the one or more slidable tiles 620. For example, the pair of opposing side walls 411 may each include one or more grooves 416. The one or more grooves 416 formed in the opposing side walls 411 may oppose or face one another. The one or more grooves 416 may be configured to receive and capture a portion of the one or more slidable tiles 620, limiting a range of motion (e.g., sliding) of the slidable tile(s) 620 and preventing the slidable tile(s) 620 from being removed or separated from the track 410.

In accordance with some examples, as illustrated in FIG. 4, each of the side walls 411 may include two separate grooves 416. Each of the grooves 416 may be disposed on opposite sides of the side wall 411 and configured to receive or capture a portion of a different slidable tile 620 coupled to the track 410. A range of motion of a slidable tile 620 coupled to each of the grooves 416 may be limited to a size (e.g., length) of the groove 416 in which a portion of the slidable tile 620 is disposed.

Returning to FIG. 6, each of the slidable tiles 620 may include one or more flanges 625 extending from an outer wall 622 of the slidable tile 620. The one or more flanges 625 may be disposed in respective grooves (e.g., grooves 416) of a track (e.g., track 410), such that the slidable tiles 620 are movably (e.g., slidably) coupled to the track. For example, the one or more flanges 625 may be captured or retained within a respective groove, such that the slidable tile 620 is slidably coupled to the track. In accordance with some examples, a flange 625 may extend from each of two opposite sides of the outer wall 622. In these examples, the flanges 625 may be disposed (e.g., retained, captured) in respective grooves of a pair of grooves (e.g., grooves 416) disposed across from one another in the pair of opposing side walls 411.

Referring generally to FIGS. 4-6, in accordance with some examples, a removable tile 610 must first be removed or separated from the track 410, before a sliding tile 620 may be moved (e.g., slid) along the track 410. For example, when the one or more removable tiles 610 are coupled to the track 410, the one or more sliding tiles 620 may be disposed between (e.g., abut) the one or more removable tiles 610 and the end wall 412, such that the slidable tiles 620 are not free to move, and thus, one or more treat compartments included in the base 110 are not accessible. However, after the one or more removable tiles 610 are removed or separated from the track 410, the one or more slidable tiles 620 may be free to slide along the track 410, for example, along a groove 416 included in the track 410. Accordingly, the one or more slidable tiles 620 may be moved such that one or more treat compartment(s) 310 disposed below an original or starting location of the slidable tile 620 may be accessed by a pet.

Returning to FIG. 4, the platform 210 may further include a socket 440 (e.g., platform socket) configured to receive a pin (e.g., pin 130) for rotatably coupling the platform 210 to the base 110. For example, as shown in FIG. 4, the socket 440 may have a round (e.g., circular) cross sectional shape and may be configured to receive a portion of a pin having a round cross sectional shape, such that when the pin extends through the socket 440, the platform 210 may be free to rotate relative to the pin. According to some examples, the socket 440 may include an outer wall defining an outer perimeter of a body of the socket 440.

Additionally, as shown in FIG. 4, the platform 210 may further include a circular cavity 450. The circular cavity 450 may be disposed around the socket 440. According to some example, an outer wall of the socket 440 may define one side of the circular cavity 450 and a cavity wall opposite the outer wall of the socket 440 may define an opposite side of the circular cavity 450. As described hereinafter in greater detail, the circular cavity 450 may be configured to receive a portion of the hinge support 230 for (e.g., directly) coupling the hinge support 230 to the platform 210. As shown in FIG. 4, one or more detents 451 disposed in the cavity wall defining an outer perimeter of the circular cavity 450 may be configured to receive a portion of the hinge support 230, for example, a tab extending from the hinge support 230 for coupling the hinge support 230 to the platform 210.

Still referring to FIG. 4, in accordance with some examples, the platform 210 may further include one or more treat compartments 460 (e.g., platform treat compartments) configured to hold food (e.g., treats, kibble) for a pet. The size, shape, and number of treat compartments 460 included in the platform 210 may vary. In some examples, as described hereinafter in greater detail, one or more doors (e.g., doors 240) may selectively cover the one or more treat compartments 460 included in the platform 210.

In some examples, as described hereinafter in greater detail, the platform 210 may further include one or more apertures or mounting holes 470 configure to receive a fastener for coupling the hinge support 230 to the platform 210.

Figure 7:
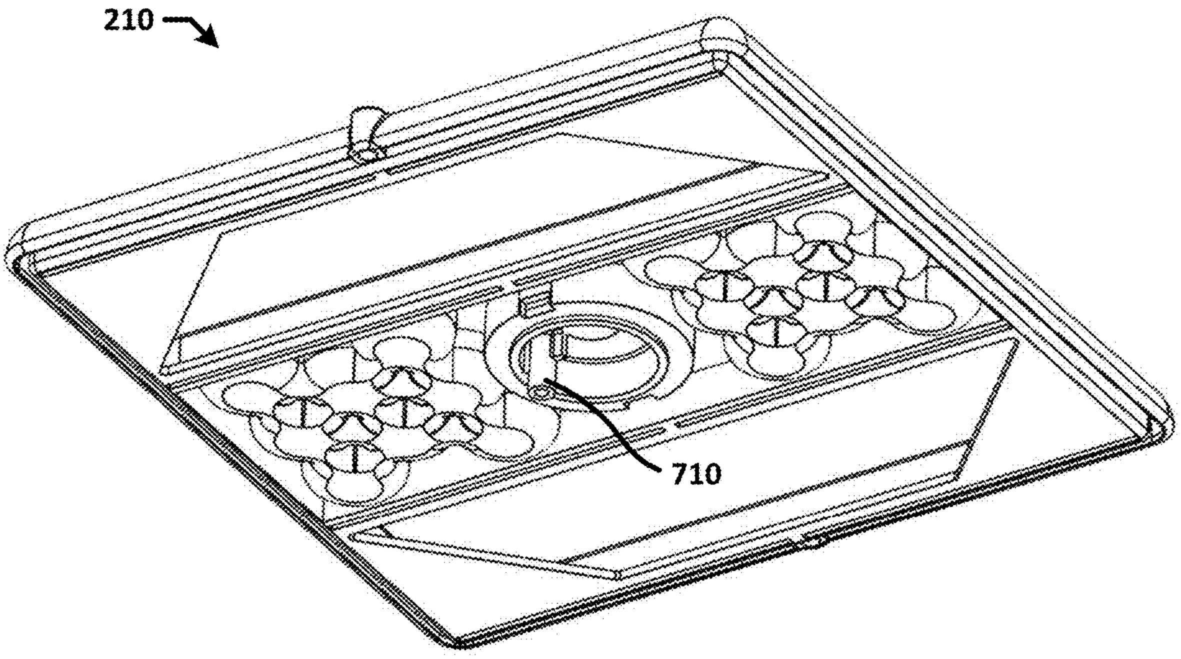
FIG. 7 illustrates a bottom perspective view of a platform of the pet toy of FIG. 1 in accordance with one example of the present disclosure.

Referring to FIG. 7, a bottom view of the platform 210 is illustrated in accordance with one example of the present disclosure. According to some examples, as shown in FIG. 7, the platform 210 may include a key 710 extending from the platform 210. For example, the key 710 may extend downward from a bottom surface of the platform 210. Referring generally to FIGS. 3 and 7, a keyway 330 included in the base 110 may be configured receive the key 710 extending from the platform 210. For example, when the platform 210 is rotatably coupled to the base 110, the key 710 may be disposed within the keyway 330 of the base 110. For example, the key 710 may be captured within the keyway 330, such that the key 710 and the keyway 330 may collectively limit a range of motion (e.g., rotation) of the platform 210 relative to the base 110. In accordance with some examples of the present disclosure, the keyway 330 and the key 710 may limit a range of motion of the base 110 and the platform 210 relative to one another such that the base 110 and the platform 210 are free to rotate in a range between 270 and 45 degrees, between 225 and 90 degrees, or between 180 and 135 degrees. For example, a range of rotation of the base 110 relative to the platform may be 120 degrees.

Figure 8:
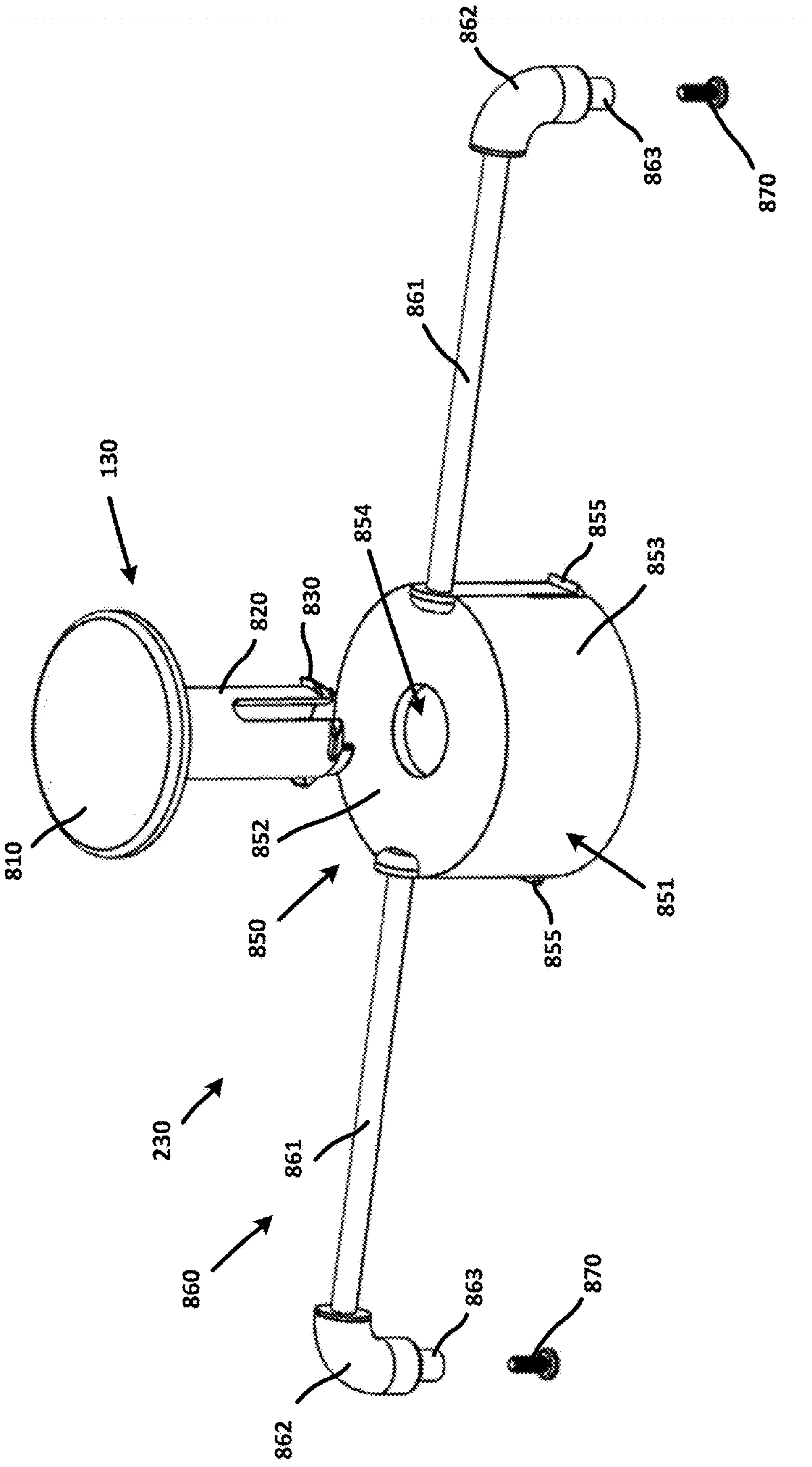
FIG. 8 illustrates a pin and a hinge support of the pet toy of FIG. 1 in accordance with one example of the present disclosure

Referring to FIG. 8, a pin 130 and a hinge support 230 of the pet toy 100 of FIG. 2 are illustrated in accordance with one example of the present disclosure. The pin 130 may rotatably couple the rotating stage 120 to the base 110. As shown in FIG. 8, the pin 130 may include a head 810 and a body 820 extending from the head 810. The body 820 of the pin 130 may include a proximal end disposed at the head 810 and a distal end opposite the head 810. The pin 130, for example, the body 820 of the pin 130, may be inserted through the hinge support 230, the socket 440 extending through the platform 210, and/or the receptacle 320 extending through the base 110, rotatably coupling the rotating stage 120 (e.g., the platform 210) to the base 110.

According to the present disclosure, the head 810 of the pin may be configured to abut a surface of the rotating stage 120, for example, a surface (e.g., upper surface) of the hinge support 230 or the platform 210, when the pin 130 extends through the hinge support 230, the platform 210, and/or the base 110, rotatably coupling the rotating stage 120 and the base 110. For example, the head 810 of the pin 130 may contact a surface of the rotating stage 120, such that the body 820 of the pin 130 cannot be pulled all the way through the rotating stage 120 and the base 110. Additionally, a distal end of the body 820 may include one or more barbs 830. The one or more barbs 830 may be configured to maintain a position of the pin 130 within the hinge support 230, platform 210, and base 110. For example, when the pin 130 is coupled to (e.g., extends through) the hinge support 230, the platform 210, and the base 110, the one or more barbs 830 may be inserted through the receptacle 320 in the base 110. After passing through the receptacle 320, the one or more barbs 830 may engage (e.g., abut, contact) a bottom surface of the base 110, preventing the pin 130 from being withdrawn from the receptacle 320.

Still referring to FIG. 8, the hinge support 230 may include a hub 850 and at least one hinge arm 860 extending from the hub 850. The hub 850 may have a body 851 including a top surface 852 and a peripheral wall 853 extending (e.g., downward) from the top surface 852. According to some examples, as shown in FIG. 8, the top surface 852 may have a round (e.g., circular) shape; however, the present disclosure is not limited thereto and the top surface 852 may have another shape. For example, the top surface 852 may have a polygonal (e.g., triangular, rectangular, square, pentagonal, etc.) shape, another curved (e.g., elliptical, oblong) shape, or the like.

The hub 850 may further include an opening 854 configured to receive the pin 130 for coupling the hinge support 230 to a platform (e.g., platform 210) and a base (e.g., base 110) of the pet toy (e.g., pet toy 100). For example, the opening 854 may extend through the top surface 852 of the hub 850. According to some examples, when the pin 130 is coupled to the hinge support 230, the platform 210, and the base 110, the head 810 of the pin 130 may abut the top surface 852 of the hub 850.

In accordance with some examples, the hub 850 may be directly coupled to the platform 210. For example, the peripheral wall 853 of the hub 850 may include one more tabs 855 extending away from a center of the hub 850. Referring generally to FIGS. 4 and 8, the hinge support 230 may be (e.g., directly) coupled to the platform 210 by inserting the peripheral wall 853 of the hub 850 into the circular cavity 450 disposed in the platform 210. For example, the peripheral wall 853 of the hub 850 may be snap or press fit into the circular cavity 450, such that one or more tabs 855 extending from the hub 850 are disposed within respective detents 451 disposed in the cavity wall of the circular cavity 450.

Returning to FIG. 8, the hinge support 230 may further include at least one hinge arm 860 extending from the hub 850. The hinge arm 860 may include a rod 861 (e.g., a hinge rod 861) and an elbow 862. The rod 861 may include a proximal end disposed at the hub 850 and a distal end opposite proximal end at the hub 850. According to the present disclosure, one or more doors 240 may be rotatably coupled to the rod 861. For example, an axial cross section of the rod 861 may have a circular shape, such that the one or more doors 240 may be rotatably coupled to the rod 861. The one or more doors 240 may be configured to rotate about the rod 861. In accordance with some examples of the present disclosure, the rod 861 may extend horizontally from the hub 850, such that the one or more doors 240 rotate about an axis perpendicular to an axis about which the platform 210 rotates relative to the base 110.

According to the present disclosure, the elbow 862 may be disposed at a distal end of the rod 861. According to some examples, the elbow 862 and the rod 861 may be integrally formed as a single component. According to other examples, the elbow 862 and the rod 861 may be coupled to one another. For example, the elbow 862 may be configured to receive a portion of the rod 861, coupling the elbow 862 and the rod 861. The elbow 862 may include a first end (e.g., directly) adjacent to the rod 861 and a second end offset ninety degrees from the first end. In accordance with some examples, as shown in FIG. 8, the second end of the elbow 862 may include a receptacle 863 (e.g., an elbow receptacle 863) configured to receive a fastener 870. For example, referring generally to FIGS. 4 and 8, the receptacle 863 may be configured to receive a fastener 870 inserted (e.g., from below the platform 210) through a mounting hole 470 included in the platform 210 and into the receptacle 863. According to some examples, the fastener 870 may threadedly engage the receptacle 863, coupling the platform 210 and the hinge support 230. The fastener 870 may be any of a screw, a bolt, a rivet, a nail, or the like.

According to some examples, as shown in FIG. 8, the hinge support 230 may include a pair of hinge arms 860. For example, each of the pair of hinge arms 860 may extend from opposite sides of the hub 850. However, the present disclosure is not limited thereto and any number of hinge arms 860 may be included. For example, one, three, four, or more than four hinge arms 860 may be included.

Figure 9:
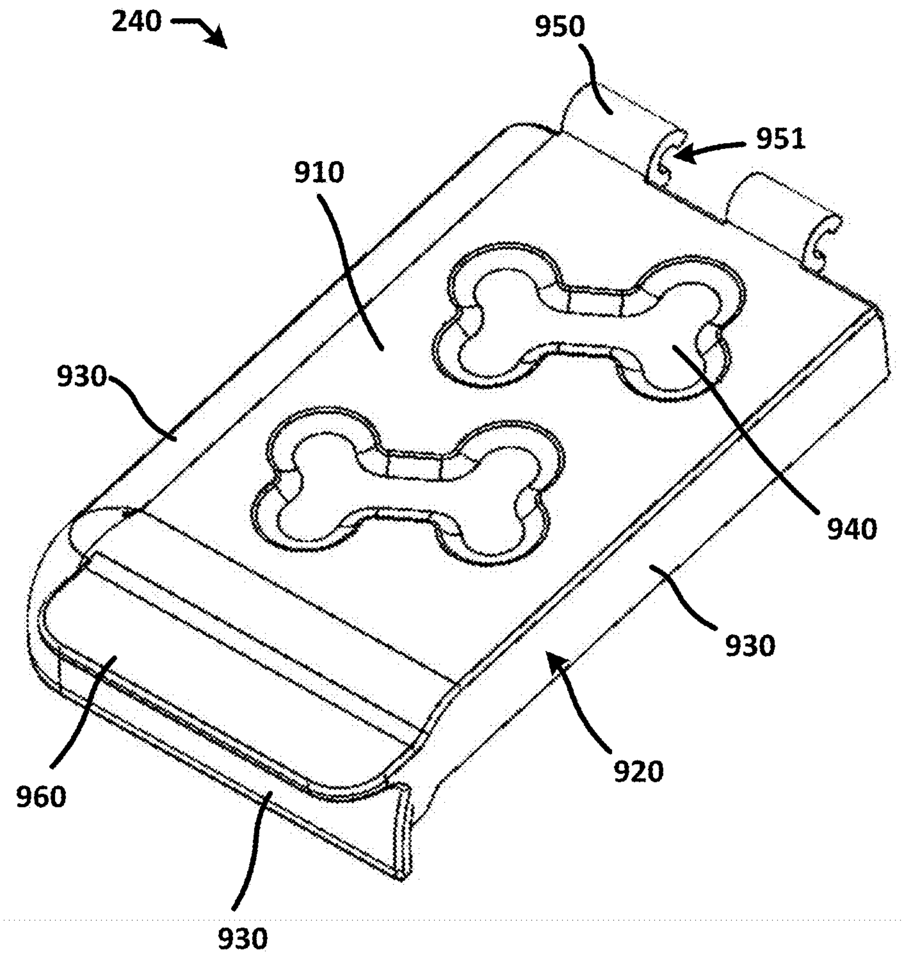
FIG. 9 illustrates a door of the pet toy of FIG. 1 in accordance with one example of the present disclosure.

Referring to FIG. 9, a door 240 is illustrated in accordance with one example of the present disclosure. As described above, one or more doors 240 may be rotatably coupled to the platform 210. For example, the one or more doors 240 may rotate relative to the platform 210 so as to selectively cover a portion of one or more openings 420 extending through the platform 210. For example, a pet may be required to move a door 240 from a closed or downward position in which the door 240 (e.g., directly) abuts (e.g., a top surface of) the platform 210 and covers a portion of an opening 420 in the platform 210 to an upward or open position in order to do any one, any combination, or all of: (1) access a treat compartment 310 in the base 110 through the opening 420; (2) remove a tile 610 from a track 410 included in the platform 210; (3) slide a tile 620 along a track 410 included in the platform 210; or (4) access a treat compartment 460 in the platform 210.

As shown in FIG. 9, the door 240 may include a cover or top panel 910 and a curtain 920 extending from the top panel 910. According to the present disclosure, the top panel 910 and the curtain 920 may be configured to cover or conceal a portion of a track 410 and/or opening 420 included in the platform 210 when the door 240 is in a closed position, for example, as illustrated in FIG. 2. For example, the door 240 may be configured to prevent a pet from accessing one or more treat compartments 310 included in the base 110 through the opening, one or more tiles 220 coupled to a track 410 of the platform 210, and/or one or more treat compartments 460 in the platform 210, when the door 240 is in the closed position. The curtain 920 may extend from the top panel 910 along a periphery of the top panel 910. According to some examples, the curtain 920 may include a plurality of side panels 930. Each of the side panels 930 may extend from the top panel 910 along a respective side of the top panel 910.

According to some examples, the top panel 910 may include one or more representations or images 940. For example, as shown in FIG. 9, the top panel 910 may include an image 940 of a bone; however, the present disclosure is not limited thereto. For example, the top panel 910 may include an image 940 of any item, object, or animal. According to some examples, the top panels 910 of doors 240 covering a portion of an opening 420 in the platform 210 and treat compartments 460 included in the platform 210, respectively, may include different images 940, such that a pet may distinguish a door 240 covering a portion of the opening 420 and a door 240 covering one or more treat compartments 460 included in the platform 210.

As shown in FIG. 9, the door 240 may further include at least one clip 950 configured to rotatably couple the door 240 to the hinge support 230. The clip 950 may be configured to capture a portion of the hinge support 230. For example, the clip 950 may be configured to capture a rod 861 of the hinge support 230. According to some examples, as shown in FIG. 9, the clip 950 may have a (e.g., substantially) "C" shape cross section, which forms a channel 951. The channel 951 may be configured to capture the rod 861 of the hinge support 230. For example, the rod 861 may be press or snap fit into the channel 951 of the clip 950, such that the rod 861 is maintained within the channel 951 of the clip 950. For example, the clip 950 may elastically deform as the channel 951 receives the rod 861 and after the rod 861 is fully inserted into the channel 951, the clip 950 may return to its original (e.g., undeformed) state, such that the rod 861 is not free to move or pass outside of the channel 951.

In some examples, the door 240 may further include a handle 960. The handle 960 may extend or protrude from the top panel 910 and/or curtain 920 of the door 240. The handle 960 may be configured to facilitate movement of the door 240. For example, the handle 960 may extend away from the top panel 910 and/or curtain 920 of the door 240, such that a pet (or person) may manipulate (e.g., a position of) the door 240 using the handle 960. For example, a pet may contact the handle 960 with their paw(s), snout, mouth, or the like, in order to move the door 240 from the closed position to an open position in which the pet may access one or more treat compartments 310 included in the base 110 through an opening in the platform 210, move one or more tiles 220 coupled to a track 410 of the platform 210, and/or access one or more treat compartments 460 in the platform 210.

Figure 10:
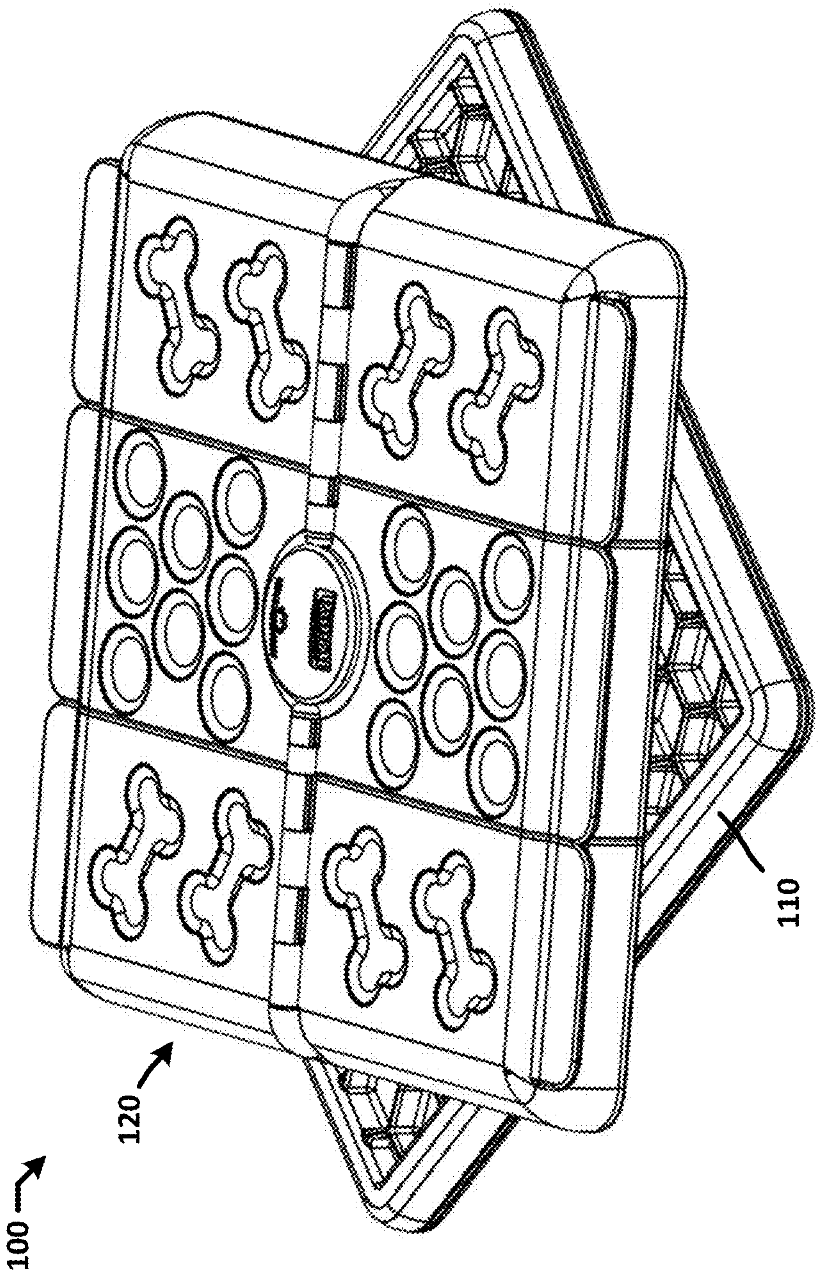
FIG. 10 illustrates a top perspective view of a stage of the pet toy of FIG. 1 rotated relative to the base in accordance with one example of the present disclosure.

Referring to FIG. 10, the pet toy 100 of FIG. 1 is illustrated in a state in which the rotating stage 120 has been rotated relative to the base 110 in accordance with one example of the present disclosure. As described above, in some examples, a pet may be required to rotate the rotating stage 120 relative to the base 110 in order to access all of the treat compartments 310 included in the base 110 of the pet toy 100. For example, only some (e.g., less than all) of the treat compartments 310 included in the base 110 may be accessible through the opening(s) 420 in each position of the rotating stage 120 relative to the base 110. Accordingly, a pet may be required to rotate the rotating stage 120 relative to the base 110 one or more times to access all of the treat compartments 310 included in the base 110.

In accordance with the present disclosure, a pet may rotate the rotating stage 120 relative to the base 110 by contacting (and exerting a force on) the rotating stage 120 using one or more of their paw(s), snout (e.g., nose, mouth), and the like. A pet may rotate the rotating stage 120 by contacting (and exerting a force on) one or more of the platform 210, the tile(s) 220, the hinge support 230, or the door(s) 240 of the rotating stage 120.

Figure 11:
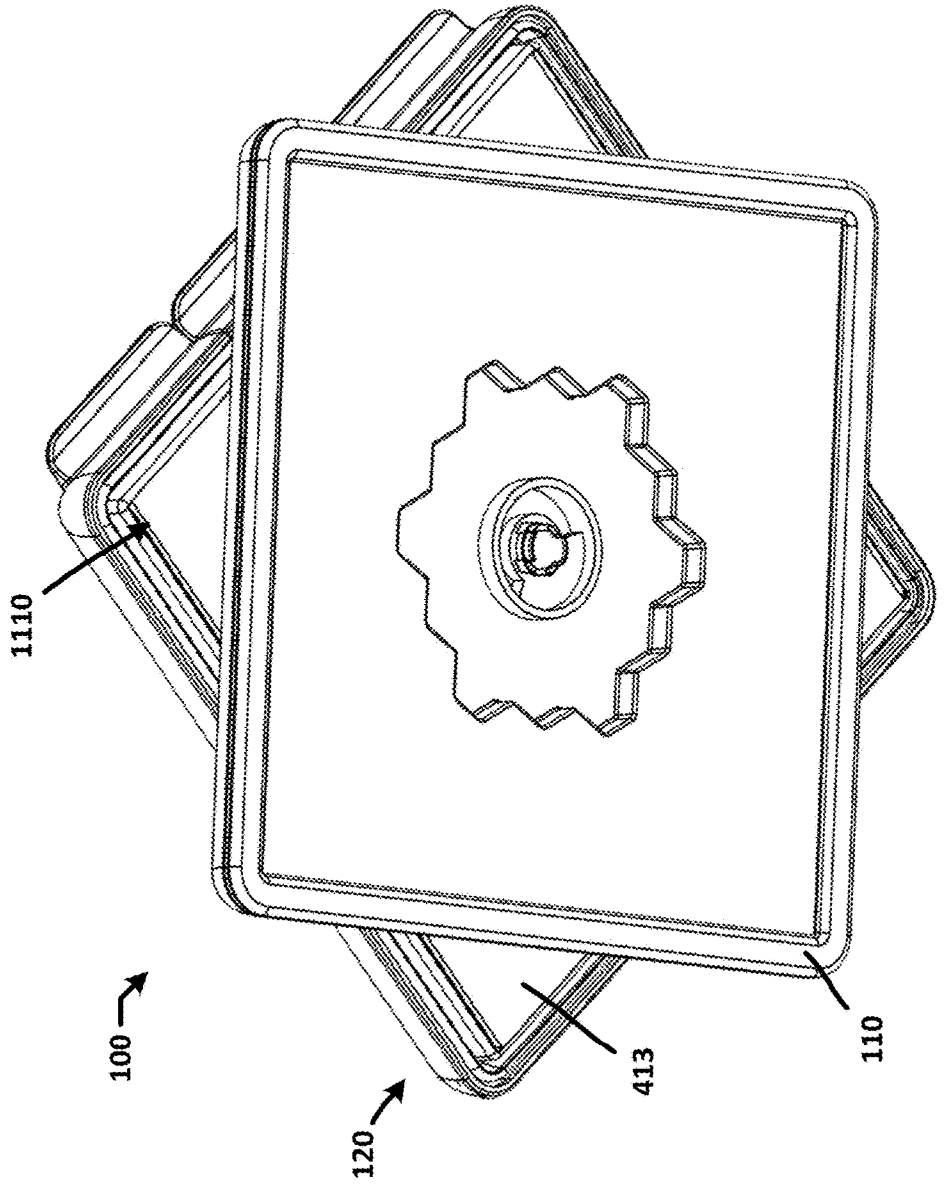
FIG. 11 illustrates a bottom perspective view of the pet toy of FIG. 1 in the state of FIG. 10 in accordance with one example of the present disclosure.

Referring to FIG. 11, a bottom view of the pet toy 100 of FIG. 10 is illustrated in accordance with one example of the present disclosure. According to the present disclosure, the position of the rotating stage 120 relative to the base 110 illustrated in FIGS. 10 and 11 may be the one in which a largest overhang 1110, for example, an overhang 1110 having a largest area, occurs at each of the corners of the rotating stage 120. As shown in FIG. 11, a portion of the platform 210 that overhangs the base 110 may include a bottom wall 413, such that an opening 420 is not disposed in a portion of the platform 210 that overhangs the base 110.

In accordance with some examples of the present disclosure, the one or more opening(s) 420 may advantageously have a trapezoidal shape, such that an opening is not disposed in a portion of the platform 210 that overhangs the base 110, and thus, a pet, for example, a paw, leg, snout, or the like of a pet may not be inserted through a portion of an opening overhanging the base 110 and caught or pinched between the base 110 and the rotating stage 120 while extending through the opening. Similarly, an opening 420 may not extend through the bottom wall 413 at the corners of the platform 210, such that an opening 420 is not disposed in a portion of the platform 210 that overhangs the base 110.

In accordance with the present disclosure, any of the components or elements of the pet toy 100 described above as being moved or manipulated by a pet, for example, the rotating stage 120, the platform 210, the tile(s) 220, the hinge support 230, and/or the door(s) 240 may also be manipulated and/or moved by a human, for example, to do one or more of: (1) place treats in treat compartments 310, 460; (2) remove treats from treat compartments 310, 460; (3) return the pet toy 100 to a starting position, for example, in which all tile(s) 220 are coupled to their respective tracks 410, all door(s) 240 are closed, and the like; or (4) clean the pet toy 100.

Additionally, provided herein are pet toys including a base having a plurality of treat compartments and a rotating body rotatably coupled to the base. The rotating body may include one or more blades and one or more folding panels. The blade(s) and folding panel(s) may be configured to selectively cover one or more treat compartments disposed in the base, blocking or preventing a pet from accessing the one or more treat compartments in the base. Each folding panel may be rotatably couple to a blade, so as to fold or stack on top of the blade. According to the present disclosure, a pet may be required to fold or stack the folding panel onto the blade in order to access some of the treat compartments included in the base. Accessing all of the treat compartments included in the base may require a pet to sequentially or iteratively rotate the rotating body relative to the base, such that an area occupied by the folding panel in a starting position (e.g., before being folded or stacked on the blade) aligns with all of the treat compartments in the base.

Figure 12:
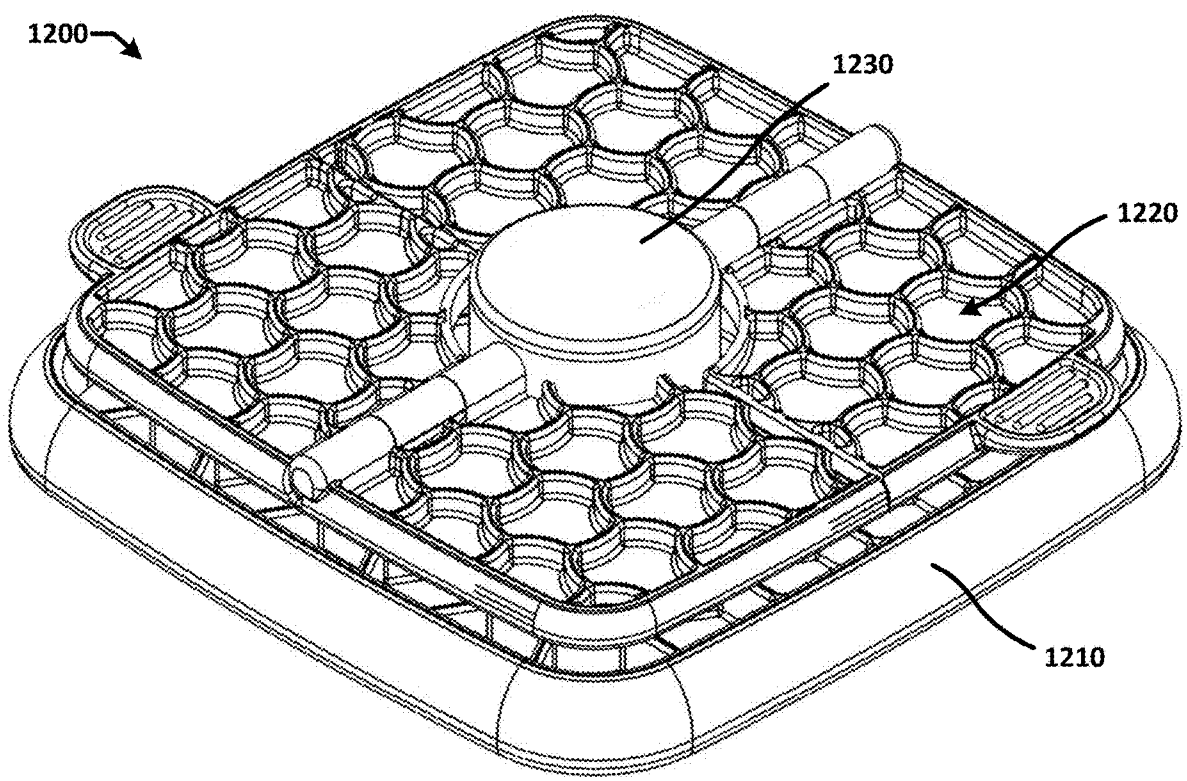
FIG. 12 illustrates a perspective view of a pet toy in accordance with another example of the present disclosure.

Referring generally to FIGS. 12-15, a pet toy 1200 is illustrated in accordance with another example of the present disclosure. As shown in FIG. 12, the pet toy 1200 may include a base 1210, a rotating body 1220, and a pin 1230 rotatably coupling the base 1210 and the rotating body 1220.

Figure 13:
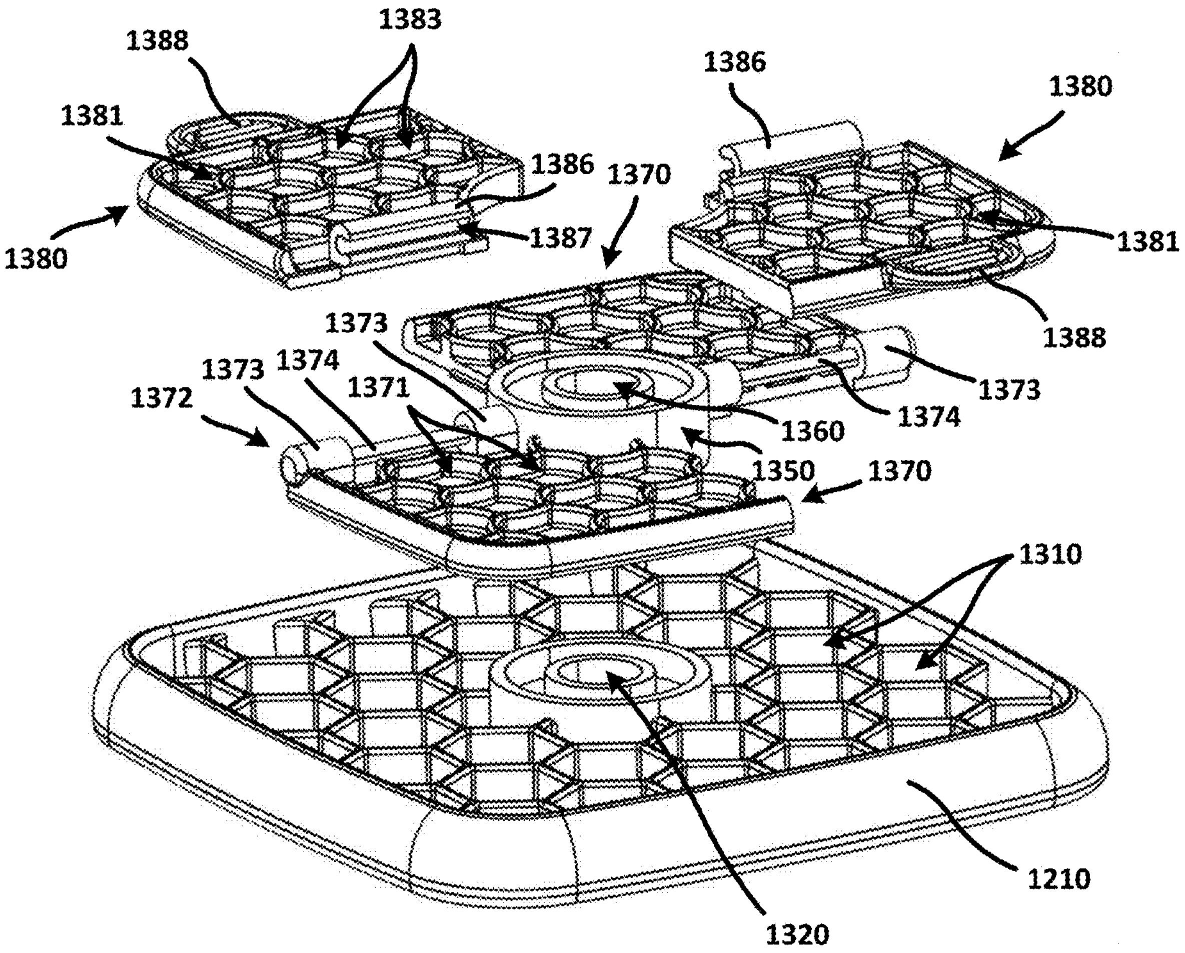
FIG. 13 illustrates an exploded view of the pet toy of FIG. 12 in accordance with one example of the present disclosure.

Referring to FIG. 13, a partial exploded view of the pet toy 1200 of FIG. 12 is illustrated in accordance with one example of the present disclosure. As shown in FIG. 13, the base 1210 may include a plurality of treat compartments 1310. Each of the treat compartments 1310 may be configured to receive and hold (e.g., store) food, for example, treats, kibble, pet friendly spreadable foods (e.g., peanut butter), and the like. In accordance with some examples, as shown in FIG. 13, each of the treat compartments 1310 may have a polygonal shape, for example, a hexagonal shape. However, the present disclosure is not limited thereto, and in other examples, the treat compartments 1310 may have another shape, for example, a different polygonal shape (e.g., triangular, rectangular, square, pentagonal), a round (e.g., circular, oval) shape, or another shape.

As shown in FIG. 13, the base 1210 may further include a socket or opening 1320 configured to receive the pin 1230 for rotatably coupling the base 1210 and the rotating body 1220. In some examples, as shown in FIG. 13, the opening 1320 may have a circular cross-sectional shape. The opening 1320 may be configured to receive a portion (e.g., body) of the pin 1230 having a circular cross-sectional shape, facilitating a movable (e.g., rotatable) connection between the rotating body 1220 and the base 1210. In some examples, as shown in FIG. 13, the opening 1320 may be disposed at a center of the base 1210. However, the present disclosure is not limited thereto, and in other examples, the opening 1320 may be disposed at another location.

As described above, the pet toy 1200 may further include a rotating body 1220 rotatably coupled to the base 1210. According to the present disclosure, the rotating body 1220 may selectively cover one or more treat compartments 1310 included in the base 1210. Accordingly, a pet may be required to rotate the rotating body 1220 to access all of the treat compartments 1310 included in the base 1210.

As shown in FIG. 13, the rotating body 1220 may include a hub 1350 including a socket 1360 (e.g., rotating body socket 1360), at least one blade 1370 extending from the hub 1350, and at least one panel 1380 (e.g., folding panel 1380) movably coupled to the at least one blade 1370. According to some examples, as shown in FIG. 13, the hub 1350 may have a cylindrical shape, including circular top and bottom surfaces and an outer wall extending between the top and bottom surfaces. However, the present disclosure is not limited thereto, and in other examples, the hub 1350 may have another shape. For example, the hub 1350 may have a parallelepiped, or another shape.

The hub 1350 may include a socket 1360 configured to receive a portion of the pin 1230 for rotatably coupling the base 1210 and the rotating body 1220. The socket 1360 may extend through the hub 1350 (e.g., between the top and bottom surfaces of the hub 1350). As shown in FIG. 13, the socket 1360 may have a cylindrical shape (e.g., having a circular cross-section). According to the present disclosure, the socket 1360 may be configured to receive a cylindrical portion (e.g., a body) of the pin 1230, such that, the rotating body 1220 and the pin 1230 are free to rotate (e.g., about a body of the pin 1230) relative to one another. In some examples, as shown in FIG. 13, the socket 1360 may be disposed at a center of the hub 1350.

The rotating body 1220 may further include at least one blade 1370 extending from the hub 1350. The at least one blade 1370 may be configured to selectively cover one or more treat compartments 1310 disposed in the base 1210, preventing a pet from accessing the covered treat compartment(s) 1310. Accordingly, a pet may be required to move (e.g., rotate) the rotating body 1220 relative to the base 1210 to access one or more treat compartments 1310 disposed below the blade 1370.

The at least one blade 1370 may extend from the hub 1350. For example, the at least one blade 1370 may extend from an outer wall or side of the hub 1350. The at least one blade 1370 may be fixedly coupled to the hub 1350, such that the at least one blade 1370 and the hub 1350 rotate together, relative to the base 1210.

According to some examples, as shown in FIG. 13, the at least one blade 1370 may include one or more blade treat compartments or treat compartments 1371. For example, one or more treat compartments 1371 may be disposed in an upper or top surface of the at least one blade 1370. Each of the treat compartments 1371 may be configured to receive and hold (e.g., store) food, for example, treats, kibble, pet friendly spreadable foods (e.g., peanut butter), and the like. In accordance with some examples, as shown in FIG. 13, each of the treat compartments 1371 may have a trefoil shape. However, the present disclosure is not limited thereto, and in other examples, the treat compartment(s) 1371 may have another shape, for example, a polygonal shape, for example, a hexagonal shape. However, the present disclosure is not limited thereto, and in other examples, the treat compartments 1371 may have another shape, for example, a different polygonal shape (e.g., triangular, rectangular, square, pentagonal, hexagonal), a round (e.g., circular, oval) shape, or another shape.

According to some examples, as shown in FIG. 13, the at least one blade 1370 may include a hinge mount 1372 disposed along a side of the at least one blade 1370. As shown in FIG. 13, the hinge mount 1372 may include a pair of knuckles 1373 extending from a body of the at least one blade 1370 and a rod 1374 extending between the pair of knuckles 1373. According to the present disclosure, the rod 1374 may have a cylindrical shape. As described hereinafter in greater detail, a panel 1380 of the rotating body 1220 may be movably (e.g., rotatably) coupled to the rod 1374.

Still referring to FIG. 13, the rotating body 1220 may include at least one folding panel or panel 1380. The at least one panel 1380 may be movably (e.g., rotatably) coupled to a blade 1370 of the rotating body 1220. The at least one panel 1380 may rotate (e.g., about a first axis) with the hub 1350 and the at least one blade 1370 relative to the base 1210. Additionally, the at least one panel 1380 may rotate (e.g., about a second axis) relative to the at least one blade 1370 to which the panel 1380 is coupled. According to the present disclosure, the one or more panels 1380 may be configured to rotate between a first position, as shown in FIG. 12, in which the panel 1380 is in a downward position and covers one or more treat compartments 1310 included in the base 1210 and a second position, as shown in FIG. 14, in which the panel 1380 is stacked with a blade 1370 and covers one or more treat compartments 1371 disposed in the blade 1370.

In the first or spread position, as shown in FIG. 12, the panel 1380 may be disposed beside or next to a blade 1370 to which the panel 1380 is coupled. For example, as shown in FIG. 12, panel 1380 and blade 1370 may be collinear or coplanar. In the first position, the panel 1380 may cover one or more treat compartments 1310 included in the base 1210, preventing a pet from accessing the covered treat compartments 1310. Accordingly, a pet may be required to (1) rotate the rotating body 1220; or (2) move panel 1380 to the second position to access the covered treat compartments 1310.

Figure 14:
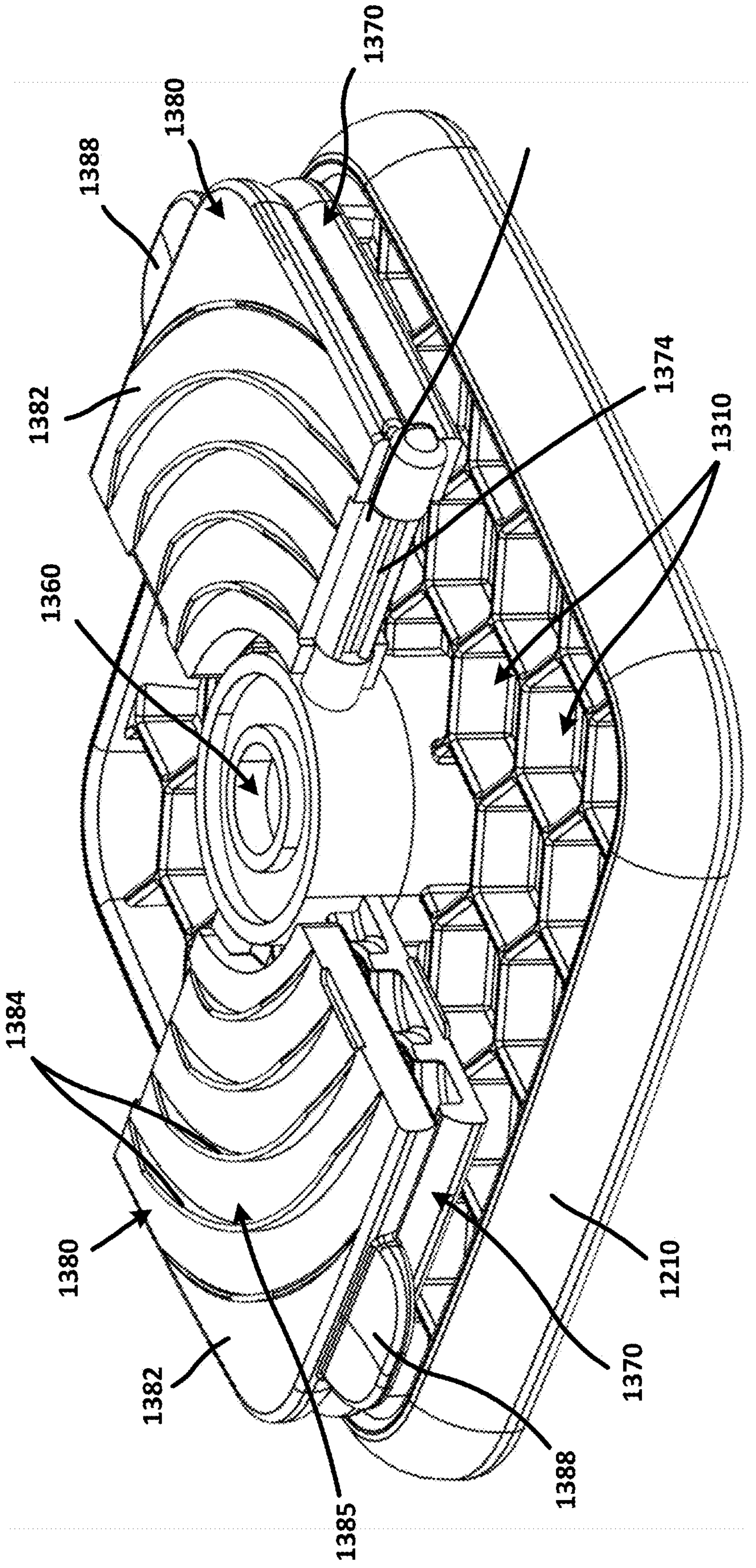
FIG. 14 illustrates the pet toy of FIG. 12 in a state in which the rotating body is in a folded arrangement.

Referring generally to FIGS. 12-14, each of the panels 1380 may include a first side or first surface 1381 and a second side or second surface 1382 opposite the first surface 1381. According to the present disclosure, when the one or more panels 1380 are in the first or spread position as shown in FIG. 12, the first surface 1381 may be disposed on a top side of the panel 1380 and may be accessible by a pet, while the second surface 1382 may be disposed on a bottom side of the panel 1380 and not accessible by a pet. However, when the one or more panels 1380 are in the second or folded position, as shown in FIG. 14 and discussed below, the second surface 1382 may be disposed on a top side of the panel 1380 and accessible by a pet, while the first surface 1381 may be disposed on a bottom side of the panel 1380 and not accessible by a pet. According to some examples, as shown in FIG. 13, the first surface 1381 may include one or more panel treat compartments or treat compartments 1383. Each of the treat compartments 1383 may be configured to receive and hold (e.g., store) food, for example, treats, kibble, pet friendly spreadable foods (e.g., peanut butter), and the like. In accordance with some examples, as shown in FIG. 13, each of the treat compartments 1383 may have a trefoil shape. However, the present disclosure is not limited thereto, and in other examples, the treat compartment(s) 1383 may have another shape, for example, a polygonal shape, for example, a hexagonal shape. However, the present disclosure is not limited thereto, and in other examples, the treat compartments 1383 may have another shape, for example, a different polygonal shape (e.g., triangular, rectangular, square, pentagonal, hexagonal), a round (e.g., circular, oval) shape, or another shape.

In the second or folded position, as shown in FIG. 14, the one or more panels 1380 may be stacked or disposed on top of the blade 1370 to which the panel 1380 is coupled. In the second position, the panel 1380 may cover one or more treat compartments 1371 disposed in the blade 1370 to which the panel 1380 is coupled, preventing a pet from accessing the treat compartments 1371 included in the blade 1370. Accordingly, when the panel 1380 is in the second position, a pet may be required to move (e.g., rotate) the panel 1380 to the first position in order to access the one or more treat compartments 1371 included in the blade 1370.

In accordance with the present disclosure, as shown in FIG. 14, when a panel 1380 is disposed in the second or folded position, the second surface 1382 of the panel 1380 may be disposed on top of the panel 1380 (i.e., on a top side of the panel 1380) and may be accessible by a pet. According to some examples, as shown in FIG. 14, the second surface 1382 of the panel 1380 may include one or more ridges or ribs 1384. The one or more ribs 1384 may extend away from a body of the panel 1380 (i.e., extend away from the second surface 1382). According to some examples, as shown in FIG. 14, the one or more ribs 1384 may have a curvilinear shape. As shown in FIG. 14, the second surface 1382 may further include one or more gaps 1385 disposed between respective pairs of the one or more ribs 1384. In accordance with some examples, the second surface 1382 may be configured to hold or store food for a pet. For example, a pet friendly or edible spread, for example, peanut butter may be placed or provided (e.g., by a human) within the one or more gaps 1385 included in the second surface 1382 of the panel 1380. The spread, for example, peanut butter may stick to the second surface 1382, for example, to the one or more ribs 1384, even when the panel 1380 is disposed in the first of spread position as shown in FIG. 12 for later consumption by a pet. In accordance with some examples, a pet may be required to move the one or more panels 1380 from the first or spread position to the second or folded position in order to access (and consume) a spread on a second surface 1382 of the panel 1380.

Referring generally to FIGS. 13 and 14, the one or more panels 1380 may further include a panel clip or clip 1386 configured to rotatably couple the panel 1380 to a respective blade 1370 of the rotating body 1220. The clip 1386 may be configured to capture a portion of the blade 1370. For example, the clip 1386 may be configured to capture the rod 1374 of the blade 1370. According to some examples, as shown in FIGS. 13 and 14, the clip 1386 may have a (e.g., substantially) "C" shape cross section, which forms a channel 1387. The channel 1387 may be configured to capture the rod 1374 of the blade 1370. For example, the rod 1374 may be press or snap fit into the channel 1387 of the clip 1386, such that the rod 1374 is maintained within the channel 1387 of the clip 1386. For example, the clip 1386 may elastically deform as the channel 1387 receives the rod 1374 and after the rod 1374 is fully inserted into the channel 1387, the clip 1386 may return to its original (e.g., undeformed) state, such that the rod 1374 cannot move or pass outside of the channel 1387.

In some examples, the panel 1380 may further include a panel handle or handle 1388. The handle 1388 may extend or protrude from the panel 1380 and be configured to facilitate movement of the panel 1380. For example, the handle 1388 may extend away from a body of the panel 1380, such that a pet (e.g., or person) may manipulate (e.g., a position of) the panel 1380 using the handle 1388. For example, a pet may contact the handle 1388 with their paw(s), snout, mouth, or the like, in order to move the panel 1380 between the first and second positions.

Figure 15:
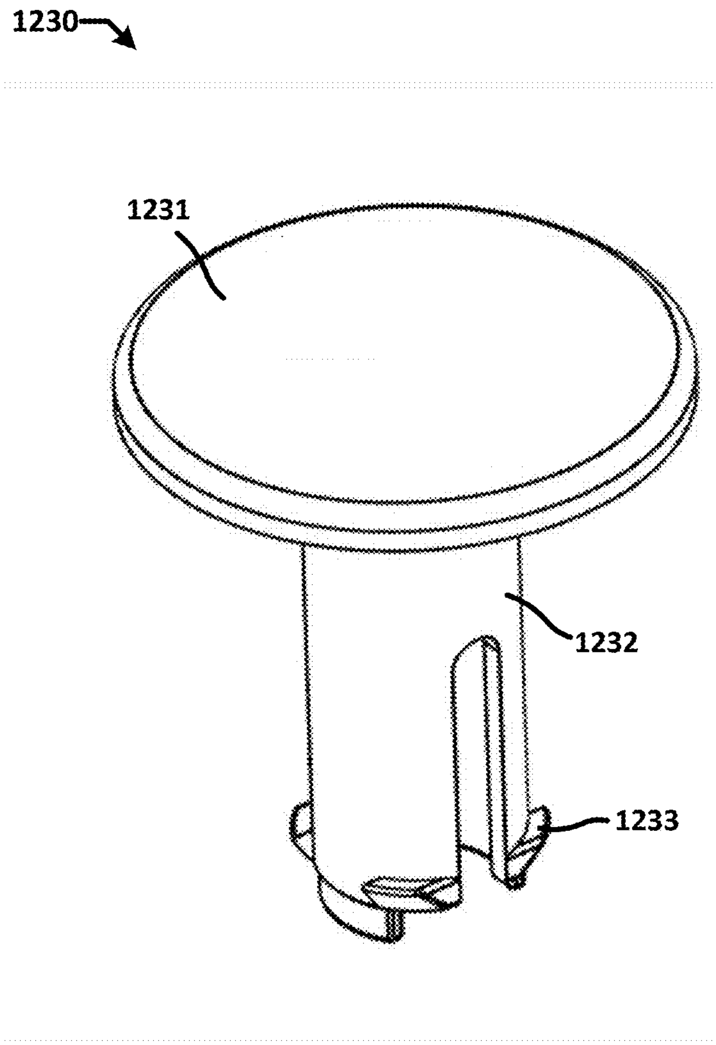
FIG. 15 illustrates a pin of the pet toy of FIG. 12 in accordance with one example of the present disclosure.

Referring to FIG. 15, the pet toy 1200 may further include a pin 1230 configured to rotatably couple the base 1210 and the rotating body 1220. The pin 1230 may include a head 1231 and a body 1232 extending away from the head 1231. The body 1232 of the pin 1230 may include a proximal end disposed at the head 1231 and a distal end opposite the proximal end (i.e., opposite the head 1231). The pin 1230, for example, the body 1232 of the pin 1230, may be inserted through the rotating body 1220 and the base 1210, rotatably coupling the rotating body 1220 and the base 1210. For example, the body 1232 of the pin 1230 may extend through the socket 1360 of the rotating body 1220 and the opening 1320 of the base 1210.

According to the present disclosure, the head 1231 of the pin may be configured to abut a surface of the rotating body 1220 when the pin 1230 extends through the rotating body 1220 and the base 1210. For example, the head 1231 of the pin 1230 may contact a surface of the rotating body 1220, such that the body 1232 of the pin 1230 cannot be pulled all the way through the rotating body 1220 and the base 1210. Additionally, a distal end of the body 1232 may include one or more barbs 1233. The one or more barbs 1233 may be configured to maintain a position of the pin 1230 within the rotating body 1220 and the base 1210. For example, when the pin 1230 is coupled to (e.g., extends through) the rotating body 1220 and the base 1210, the one or more barbs 1233 may be inserted through the opening 1320 in the base 1210. After passing through the opening 1320, the one or more barbs 1233 may engage (e.g., abut, contact) a bottom surface of the base 1210, preventing the pin 1230 from being withdrawn from the opening 1320.

Figure 16:
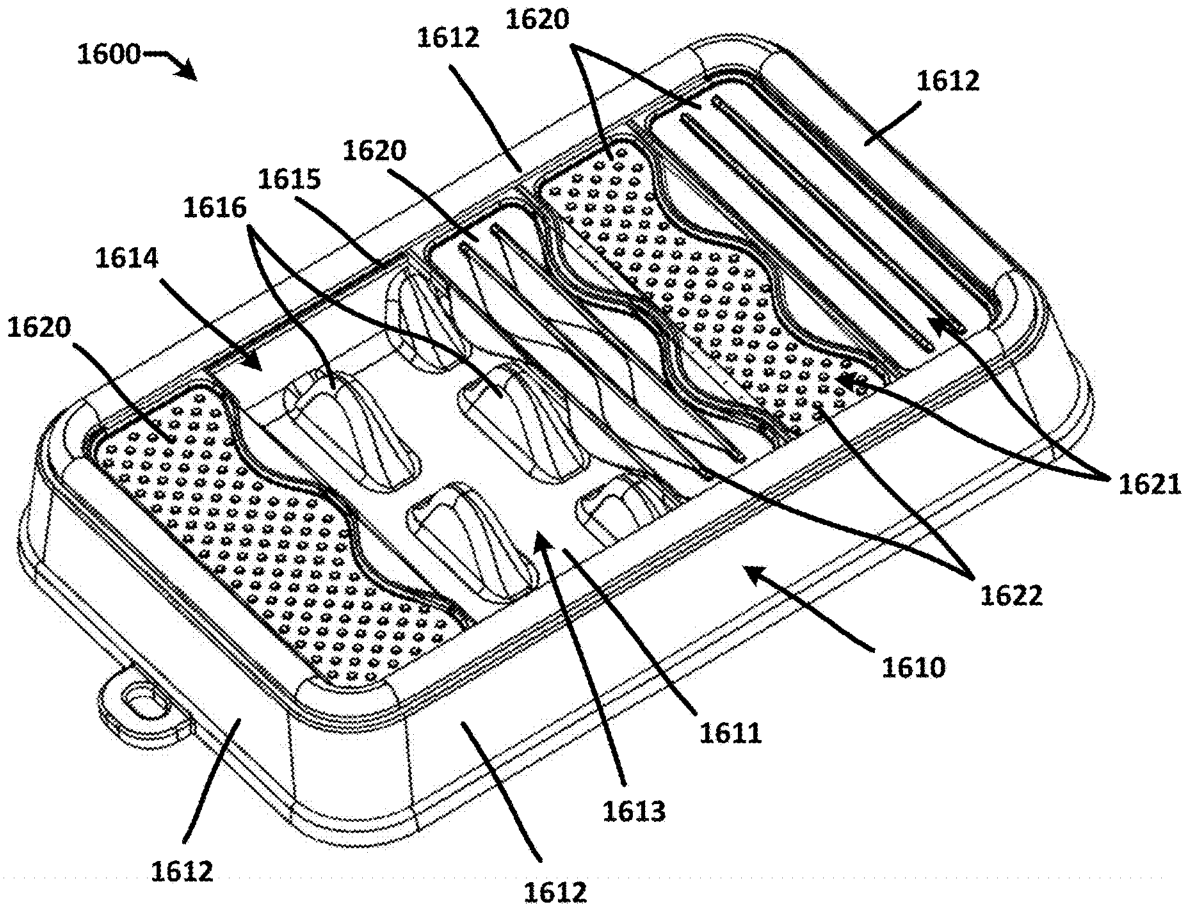
FIG. 16 illustrates a pet toy in accordance with yet another example of the present disclosure.

Referring to FIG. 16, a pet feeder or pet toy 1600 is illustrated in accordance with one example of the present disclosure. As shown in FIG. 16, the pet toy 1600 may include a container 1610 and one or more tiles or cover panels 1620 coupled to the container 1610. The container 1610 may include a base, container bottom panel, or bottom panel 1611 and one or more container side wall(s) or wall(s) 1612 extending from the bottom panel 1611. The one or more walls 1612 may extend upward from bottom panel 1611, for example, along a periphery of the bottom panel 1611, such that the bottom panel 1611 and the walls 1612 collectively define an internal compartment or internal cavity 1613 of the container 1610. The internal cavity 1613 may be configured to hold or store food (e.g., kibble, treats) for a pet. The container 1610 may further include a mouth or opening 1614 disposed at a distal end of the one or more walls 1612 (e.g., an end of the one or more walls 1612 opposite the bottom panel 1611). In other words, the opening 1614 is defined by the walls 1612 of the container 1610. The size and shape of the opening 1614 may correspond to the size and shape, respectively, of the bottom panel 1611.

According to some examples, as shown in FIG. 16, the container 1610 may include a rectangular bottom panel 1611 and four walls 1612; however, the present disclosure is not limited thereto. In other examples, a container may include a round (e.g., circular, elliptic) bottom panel and a single wall extending from a periphery of the bottom wall. In yet other examples, the container may have a bottom panel having another polygonal (e.g., triangular, square, pentagonal) shape and a number of walls corresponding to a number of sides included in the bottom panel.

As shown in FIG. 16, the container 1610 may include a channel 1615 disposed in an interior surface of the one or more walls 1612 of the pet toy 1600. According to some examples, the channel 1615 may be disposed in an interior surface of the one or more walls 1612 along an entire perimeter of the internal cavity 1613. According to other examples, two channels may be disposed in a pair of (e.g., opposite) walls of the container 1610. According to the present disclosure, the channel 1615 may be configured to receive (e.g., a portion of) the one or more cover panels 1620.

Still referring to FIG. 16, in some examples, the container 1610 may include one or more protrusions or baffles 1616. The one or more baffles 1616 may extend away (e.g., upward, sideways) from the bottom panel 1611 and/or one or more walls 1612 of the container 1610. The baffle(s) 1616 may be configured to slow the pace at which a pet consumes food disposed in the internal cavity 1613 and mentally stimulate a pet eating from the container 1610 by requiring the pet to navigate around the one or more baffles 1616 while consuming food from the internal cavity 1613.

As shown in FIG. 16, the pet toy 1600 further includes one or more cover panels 1620 movably coupled to the container 1610. The one or more cover panels 1620 may be slidably coupled to the container 1610. For example, as shown in FIG. 16, one or more edges of the cover panel(s) 1620 may be disposed within the channel 1615 of the container 1610, such that the cover panel(s) 1620 are free to slide within the channel 1615.

According to the present disclosure, each cover panel 1620 may cover or block a portion of the opening 1614, preventing a pet from accessing food disposed in the internal cavity 1613 below the cover panel 1620. Accordingly, a pet may be required to move (e.g., slide) each of the cover panels 1620 iteratively or sequentially in order to access an entirety of the internal cavity 1613 and all of the food disposed therein.

As shown in FIG. 16, each of the cover panels 1620 may include a textured top surface 1621 including one or more protrusions 1622. The protrusions 1622 may include nubs, ridges, grooves, slots, walls, lips, and the like. The textured top surface 1621 may facilitate movement of the cover panel(s) 1620 by a pet. For example, the textured top surface 1621 may advantageously increase friction between the cover panel 1620 and a pet (e.g., a paw or snout of a pet), making it easier for the pet to slide the cover panel 1620. In other words, the textured top surface 1621 allows a pet to more easily engage with or manipulate (e.g., slide) the cover panel 1620. In some examples, as shown in FIG. 16, the one or more protrusions 1622 included in a textured top surface 1621 of two or more of the cover panels 1620 may be arranged in a different pattern or design, such that a pet may (e.g., more easily) distinguish the separate cover panels 1620 coupled to the container 1610.

The pet toy 1600 of FIG. 16 may be configurable by a person to provide pets with a challenge of varying degree. For example, a human may remove one or more cover panel(s) 1620 from the channel 1615 or add additional cover panel(s) 1620 to the channel 1615 to decrease or increase, respectively, the difficulty of accessing an entirety of the internal cavity 1613 of, and thus obtaining all of the food within, the internal cavity 1613. For example, decreasing the number of cover panels 1620 coupled to the container 1610 may increase an area of the opening 1614 which is not blocked by a cover panel 1620 and reduce the number of times that the one or more cover panel(s) 1620 must be moved by a pet to (e.g., iteratively or sequentially) access an entirety of the internal cavity 1613. Conversely, increasing the number of cover panels 1620 coupled to the container 1610 may decrease an area of the opening 1614 which is not blocked by a cover panel 1620 and increase the number of times that the one or more panel(s) 1620 must be moved by a pet to (e.g., iteratively or sequentially) access an entirety of the internal cavity 1613. The size and shape of the cover panels 1620 may vary, and thus the number of cover panels 1620 installed in the container 1610 may be based on the size and shape of the cover panels 1620.

According to the present disclosure, the one or more cover panels 1620 may be press or snap fit within the channel 1615 of the container 1610. Accordingly, a person may couple a cover panel 1620 to the container by pressing the cover panel into the channel 1615 with a force exceeding a predetermined threshold. Similarly, a person may remove or separate a cover panel 1620 from the container 1610 with a separating force exceeding a predetermined threshold.

Figure 17:
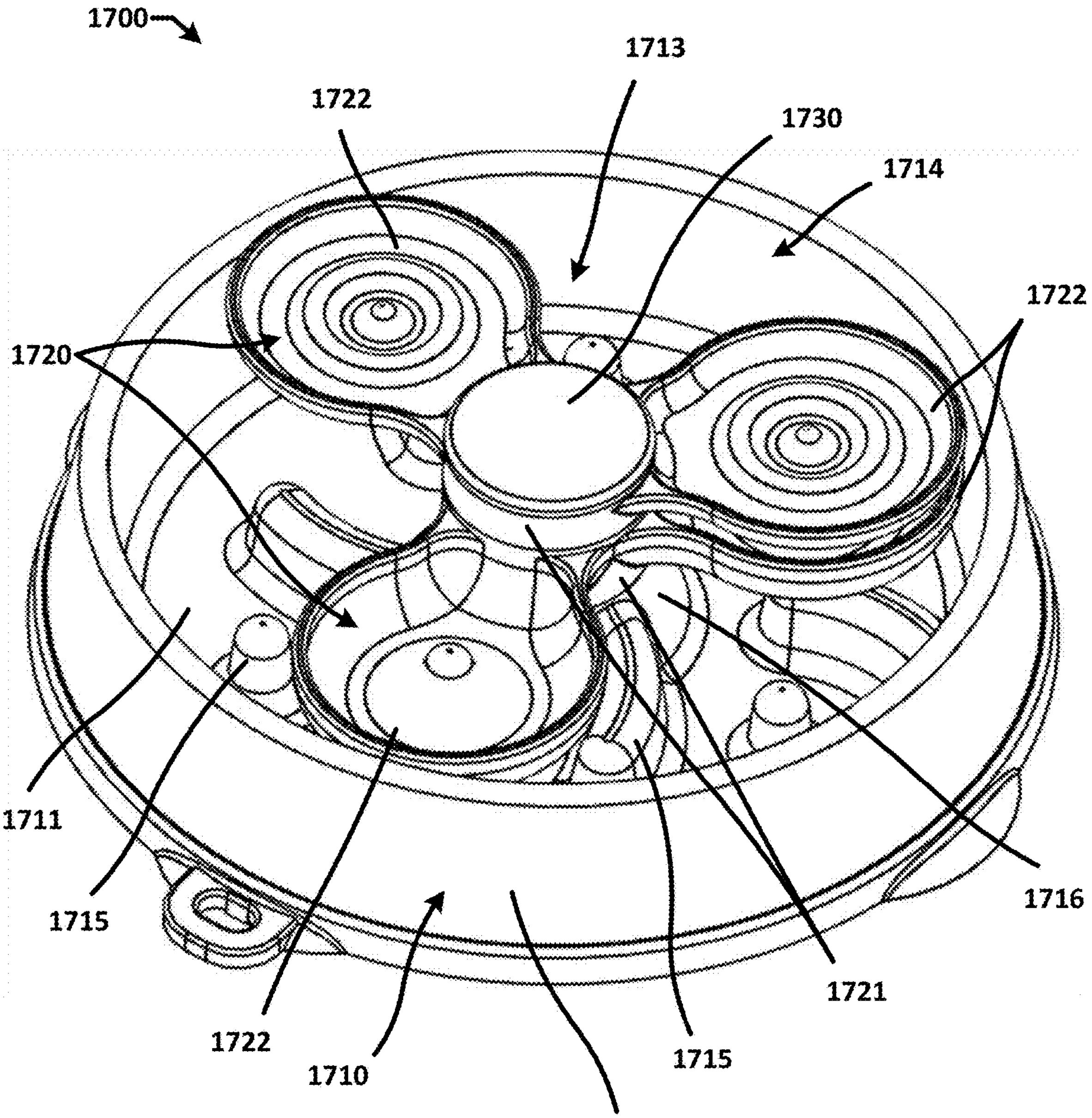
FIG. 17 illustrates a pet toy in accordance with still another example of the present disclosure.

Referring to FIG. 17, a pet feeder or pet toy 1700 is illustrated in accordance with one example of the present disclosure. As shown in FIG. 17, the pet toy may include a basin 1710, one or more rotating trays or trays 1720, and a pin 1730 rotatably coupling the one or more trays 1720 and the basin 1710. The basin 1710 may include a basin bottom panel or bottom panel 1711 and one or more basin side wall(s) or wall(s) 1712 extending from the bottom panel 1711. The one or more walls 1712 may extend upward from the bottom panel 1711, for example, along a periphery of the bottom panel 1711, such that the bottom panel 1711 and the wall(s) 1712 collectively define an internal compartment or internal cavity 1713 of the basin 1710. The internal cavity 1713 may be configured to hold or store food (e.g., kibble, treats) for a pet. The basin 1710 may further include a mouth or opening 1714 disposed at a distal end of the one or more walls 1712 (e.g., an end of the one or more walls 1712 opposite the bottom panel 1711). In other words, the opening 1714 is defined by the one or more walls 1712 of the basin 1710. The size and shape of the opening 1714 may correspond to the size (e.g., area) and shape, respectively, of the bottom panel 1711.

According to some examples, as shown in FIG. 17, the basin 1710 may include a circular bottom panel 1711 and a single wall 1712; however, the present disclosure is not limited thereto. For example, a basin may include a bottom panel having a polygonal shape and a number of walls corresponding to a number of sides included in the bottom panel. In another example, a basin may include a bottom panel having another round shape, for example, an elliptic shape and includes a single wall.

As shown in FIG. 17, the basin 1710 may include one or more protrusions or baffles 1715. The one or more baffles 1715 may extend away (e.g., upward, sideways) from the bottom panel 1711 and/or a wall 1712 of the basin 1710. The baffle(s) 1715 may be configured to slow the pace at which a pet consumes food disposed in the internal cavity 1713 and mentally stimulate a pet eating from the basin 1710 by requiring the pet to navigate around the one or more baffles 1715 while consuming food from the internal cavity 1713. The size and shape of the baffles 1715 included in the basin 1710 may vary. According to some examples, as shown in FIG. 17, the basin 1710 may include baffles 1715 having different shapes and/or sizes. For example, as shown, the basin 1710 may include one or more circular baffles 1715 and one or more curvilinear baffles 1715.

Still referring to FIG. 17, the basin 1710 may further include a pedestal 1716 extending into the internal cavity 1713 of the basin 1710 from the bottom panel 1711 of the basin 1710. In some examples, as shown in FIG. 17, the pedestal 1716 may extend upward from the bottom panel 1711 at a center of the bottom panel 1711. However, the present disclosure is not limited thereto, and the pedestal 1716 may extend from the bottom panel 1711 at another location. The plurality of trays 1720 may be (e.g., directly) coupled to the pedestal 1716. For example, the pedestal 1716 may include an aperture or opening configured to receive (e.g., a body of) the pin 1730 for rotatably coupling the plurality of trays 1720 to the pedestal 1716 of the basin 1710.

The pet toy 1700 may include one or more rotating trays or trays 1720. For example, as shown in FIG. 17, the pet toy 1700 may include two trays 1720. However, the present disclosure is not limited thereto and any number of trays 1720 may be included. For example, one, three, four, or more than four trays 1720 may be included. As shown in FIG. 17, the trays 1720 may include a tray hub or hub 1721 and one or more dishes 1722 extending from the hub 1721. According to the present disclosure, the hub 1721 may include an aperture or opening configured to receive (e.g., a body of) the pin 1730 for rotatably coupling the tray(s) 1720 to the basin 1710.

According to the present disclosure, the tray 1720 may further include one or more dishes 1722 extending from the hub 1721. The one or more dishes 1722 may have a basin or bowl shape configured to hold food (e.g., kibble, treats, an edible spread) for a pet. According to some examples, as shown in FIG. 17, two dishes 1722 may extend from each of the hubs 1721; however, the present disclosure is not limited thereto. For example, a single, three, four, or more than four dishes 1722 may extend from the hub 1721. The internal surface of the dishes 1722 may include surface textures or features to stimulate and/or challenge a pet, or to slow down food consumption of the pet.

According to the present disclosure, the one or more dishes 1722 may rotate relative to the basin 1710 with the hub 1721 of the tray 1720. According to the present disclosure, the one or more dishes 1722 may selectively cover or block a pet from accessing a portion of the internal cavity 1713 of the basin 1710, or may selectively cover or block a pet from accessing other dishes 1722 of another tray 1720. Accordingly, a pet may be required to rotate the one or more trays 1720 in order to access an entirety of the internal cavity 1713 of the basin 1710. According to some examples, as shown in FIG. 17, the one or more dishes 1722 may selectively block a pet from accessing (e.g., at least a portion of) a dish 1722 included in another one of the trays 1720. Accordingly, a pet may be required to rotate a tray 1720 in order to access a dish 1722 of another tray 1720 included in the pet toy 1700.

The pet toy 1700 may further include a pin 1730 rotatably coupling the basin 1710 and the one or more trays 1720. The pin 1730 may include a head and a body extending from the head. The body of the pin 1730 may include a proximal end disposed at the head and a distal end opposite the head. The pin 1730, for example, the body of the pin 1730 may be inserted through the one or more trays 1720 and the basin 1710 (e.g., the pedestal 1716), rotatably coupling the trays 1720 and the basin 1710. According to some examples, a distal end of the body may include one or more barbs. The one or more barbs may be configured to maintain a position of the pin 1730 within the one or more trays 1720 and the basin 1710.

The disclosed pet toys described herein involve food or treat containers or bowls having movable components configured to selectively cover portions of the container or bowl, such that a pet needs to manipulate the movable components in order to gain access to the food or treats. In addition to keeping pets entertained for extended periods, the disclosed pet toys provide pets with mental stimulus in order to improve their overall health and behavior. The disclosed pet toys provide interactive pet toys that mentally stimulate pets by requiring them to solve one or more puzzles. The disclosed interactive pet toys also reward a pet for successfully completing a puzzle, thereby encouraging the pet to engage with the toy again in the future.

For clarity of disclosure, the terms "proximal" and "distal" are defined herein relative to a point of attachment of an element. The term "proximal" refers to the position of an element closer to the point of attachment and the term "distal" refers to the position of an element further away from the point of attachment.

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. A pet toy comprising:

a base including a plurality of treat compartments; and a rotating body coupled to the base and configured to selectively cover one or more of the plurality of treat compartments, the rotating body including a blade and a folding panel rotatably coupled to the blade.

2. The pet toy of claim 1, wherein the folding panel is configured to rotate between a first position in which the folding panel is coplanar with the blade and a second position in which the folding panel is stacked on top of the blade.

3. The pet toy of claim 2, wherein when the folding panel is in the first position, the folding panel covers one or more of the plurality of treat compartments.

4. The pet toy of claim 2, wherein the blade includes a plurality of blade treat compartments, and wherein when the folding panel is in the second position, the folding panel covers one or more of the blade treat compartments.

5. The pet toy of claim 1, wherein a first side of the folding panel includes a plurality of folding panel treat compartments, and wherein a second side of the folding panel includes a plurality of ribs and gaps configured to hold a spreadable pet food.

6. The pet toy of claim 1, wherein the folding panel includes a handle configured to facilitate movement of the folding panel.

7. The pet toy of claim 1 further comprising:

a pin extending through and rotatably coupling the rotating body and the base.

8. A pet toy comprising:

a base including a plurality of treat compartments;

a rotating body coupled to the base and configured to selectively cover one or more of the plurality of treat compartments, the rotating body including a hub, a blade extending from the hub, and a folding panel rotatably coupled to the blade; and a pin extending through and rotatably coupling the rotating body and the base.

9. The pet toy of claim 8, wherein the folding panel is configured to rotate between a first position in which the folding panel is co-planar with the blade and a second position in which the folding panel is stacked on top of the blade.

10. The pet toy of claim 9, wherein when the folding panel is in the first position, the folding panel covers one or more of the plurality of treat compartments.

11. The pet toy of claim 10, wherein the blade includes a plurality of blade treat compartments, and wherein when the folding panel is in the second position, the folding panel covers one or more of the blade treat compartments.

12. The pet toy of claim 8, wherein a first side of the folding panel includes a plurality of folding panel treat compartments, and wherein a second side of the folding panel includes a plurality of ribs and gaps configured to hold a spreadable pet food.

* * * * *